(12) United States Patent
Enomoto et al.

(10) Patent No.: US 7,733,566 B2
(45) Date of Patent: Jun. 8, 2010

(54) SUPPORTING MECHANISM

(75) Inventors: Shigeo Enomoto, Tokyo (JP); Makoto Niwa, Saitama (JP)

(73) Assignee: Hoya Corporation, Tokyo (JP)

( * ) Notice: Subject to any disclaimer, the term of this patent is extended or adjusted under 35 U.S.C. 154(b) by 392 days.

(21) Appl. No.: 11/765,624

(22) Filed: Jun. 20, 2007

(65) Prior Publication Data

US 2007/0297055 A1    Dec. 27, 2007

(30) Foreign Application Priority Data

Jun. 21, 2006    (JP) .............................. 2006-171397

(51) Int. Cl.
*G02B 27/64* (2006.01)

(52) U.S. Cl. .................. 359/554; 359/557; 396/52; 396/55

(58) Field of Classification Search ......... 359/554–557, 359/819; 396/52–55
See application file for complete search history.

(56) References Cited

U.S. PATENT DOCUMENTS

| | | | |
|---|---|---|---|
| 5,637,861 A * | 6/1997 | Okada et al. ............. | 250/208.1 |
| 6,226,124 B1 | 5/2001 | Enomoto et al. | |
| 6,286,782 B1 * | 9/2001 | Bansemir et al. ......... | 244/17.11 |
| 6,603,927 B2 | 8/2003 | Enomoto | |
| 6,606,457 B2 | 8/2003 | Enomoto | |
| 2005/0052570 A1 * | 3/2005 | Enomoto .................... | 348/375 |
| 2005/0110873 A1 | 5/2005 | Enomoto | |

FOREIGN PATENT DOCUMENTS

| | | |
|---|---|---|
| JP | 6 46314 | 2/1994 |
| JP | 2005 102172 | 4/2005 |
| JP | 2005 176293 | 6/2005 |
| JP | 2006 67562 | 3/2006 |
| WO | 00 18134 | 3/2000 |

OTHER PUBLICATIONS

English language Abstract of JP 6-46314.
English language Abstract of JP 2005-102172.
English language Abstract of JP 2006-67562.
U.S. Appl. No. 11/675,865 to Enomoto, filed Feb. 16, 2007.

* cited by examiner

*Primary Examiner*—Thong Nguyen
(74) *Attorney, Agent, or Firm*—Greenblum & Bernstein P.L.C.

(57) ABSTRACT

A supporting mechanism comprises a movable unit and a fixed unit. The movable unit is movable in a reference plane. The fixed unit has a rectangular frame that is connected with the movable unit, that is composed of strips perpendicular to the reference plane, and that is fixed to another part of the fixed unit. The fixed unit movably supports the movable unit through an elastic transformation of the rectangular frame.

20 Claims, 18 Drawing Sheets

Fig. 1
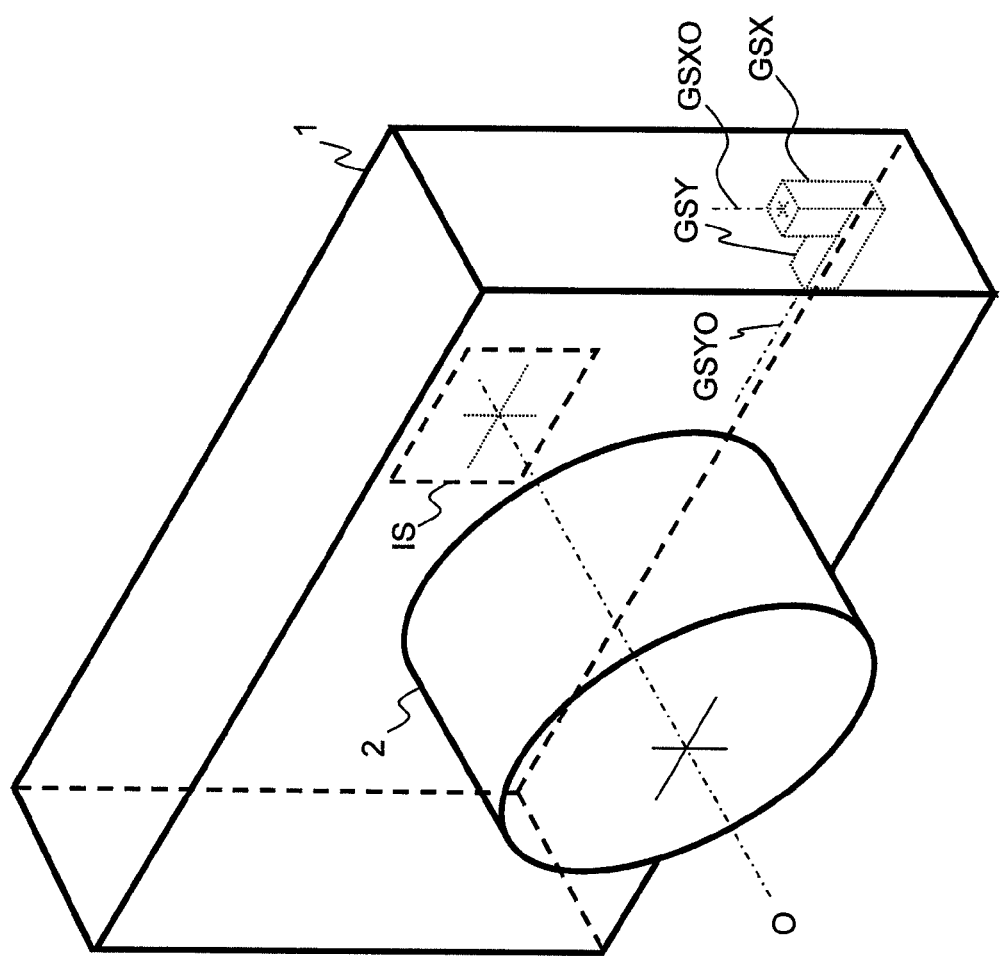
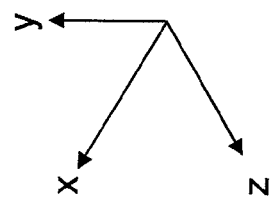

Fig. 6
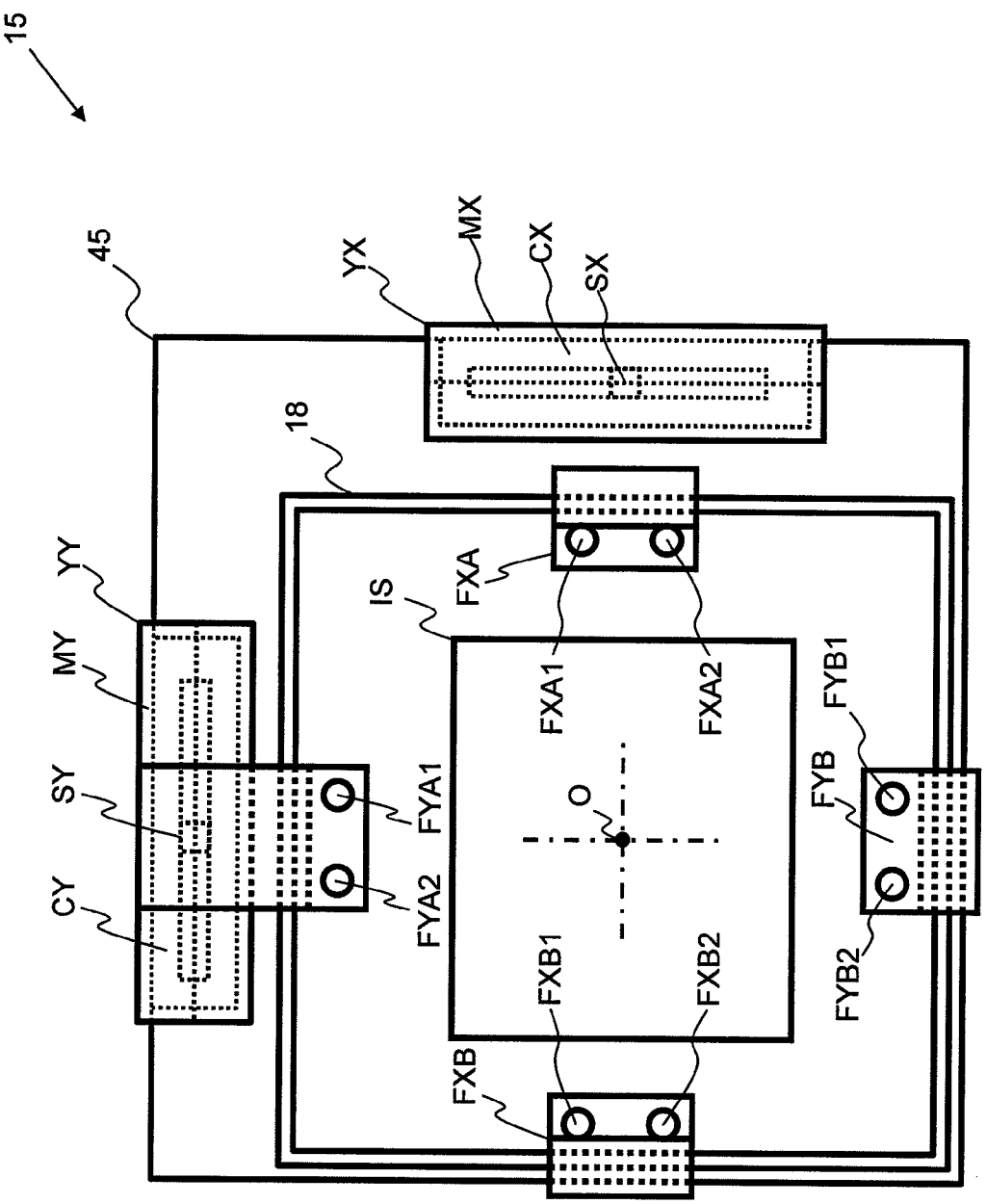
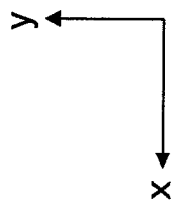

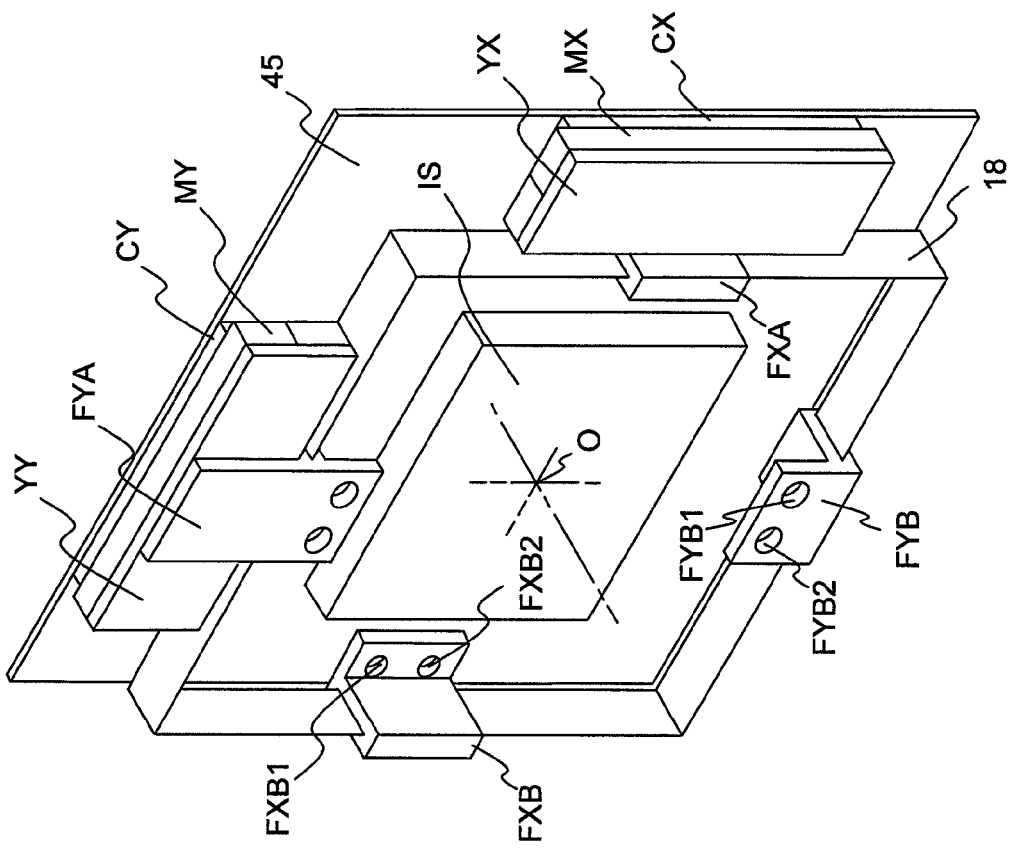
Fig. 9
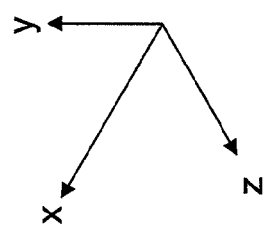

SUPPORTING MECHANISM

BACKGROUND OF THE INVENTION

1. Field of the Invention

The present invention relates to a supporting mechanism, and in particular to supporting a movable unit through an elastic transformation.

2. Description of the Related Art

An anti-shake apparatus (An image blur correcting device) for a photographing apparatus is proposed. The anti-shake apparatus reduces hand-shake effect by moving a hand-shake correcting lens or an imaging sensor on a plane that is perpendicular to the optical axis, in a manner corresponding to the amount of hand-shake which occurs during imaging.

Japanese unexamined patent publication (KOKAI) No. H06-46314 discloses a supporting mechanism of an anti-shake apparatus that supports a movable unit (a hand-shake correcting part) through an elastic member.

However, because the movable unit is supported by a plurality of elastic members, the construction of the supporting mechanism becomes complex.

SUMMARY OF THE INVENTION

Therefore, an object of the present invention is to provide a supporting mechanism that can support a movable unit through an elastic transformation without complicating the construction.

According to the present invention, a supporting mechanism comprises a movable unit and a fixed unit. The movable unit is movable in a reference plane. The fixed unit has a rectangular frame that is connected to the movable unit, that is composed of strips perpendicular to the reference plane, and that is fixed to another part of the fixed unit. The fixed unit movably supports the movable unit through an elastic transformation of the rectangular frame.

BRIEF DESCRIPTION OF THE DRAWINGS

The objects and advantages of the present invention will be better understood from the following description, with reference to the accompanying drawings in which:

FIG. 1 is a perspective view of a photographing apparatus of the first embodiment, viewed from the front side of the photographing apparatus;

FIG. 6 is a front view of the driving unit of the anti-shake unit of the first embodiment;

FIG. 9 is a perspective view of the driving unit of the first embodiment;

DESCRIPTION OF THE PREFERRED EMBODIMENTS

Figure 2:
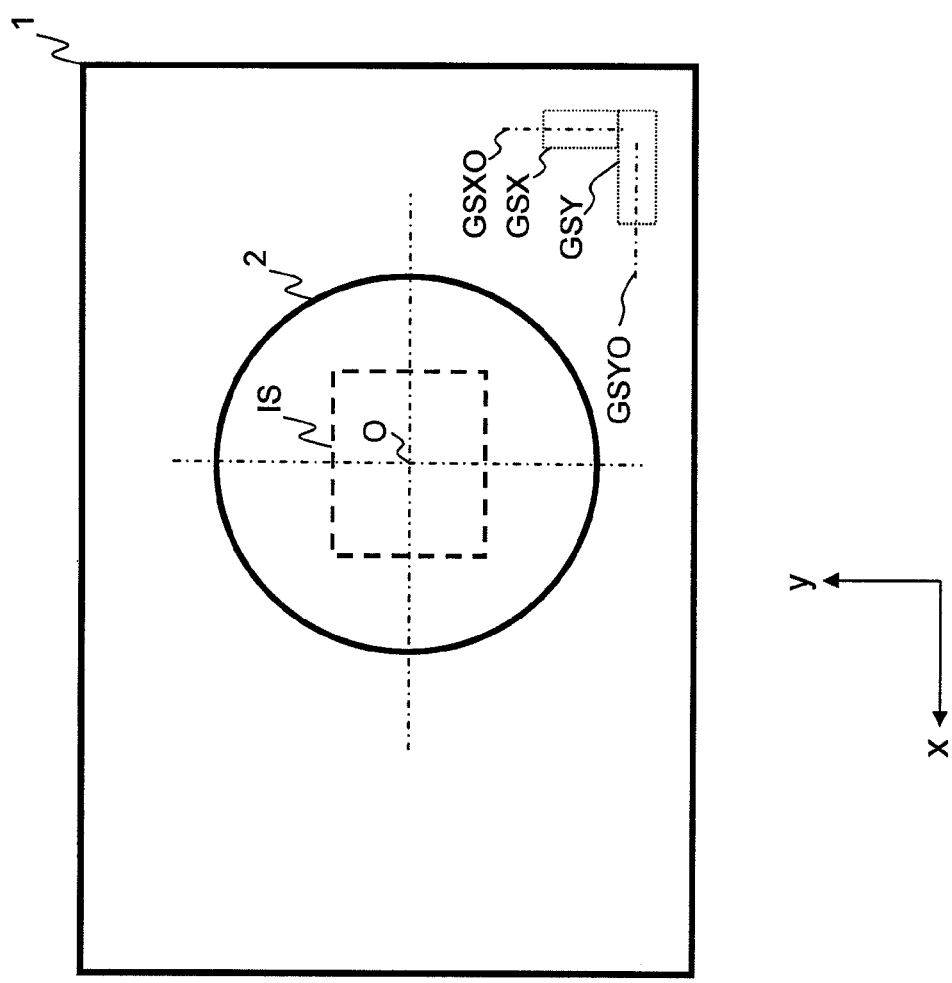
FIG. 2 is a front view of the photographing apparatus of the first embodiment.

The present invention is described below with reference to the first and second embodiments shown in the drawings. In the first and second embodiments, the photographing apparatus 1 is a digital camera. A photographing lens (not depicted) that is included in the lens barrel 2 of the photographing apparatus 1 has an optical axis O.

In order to explain the orientation in the embodiment, a first direction x, a second direction y, and a third direction z are defined (see FIG. 1). The first direction x is a direction which is perpendicular to the optical axis O. The second direction y is a direction which is perpendicular to the optical axis O and the first direction x. The third direction z is a direction which is parallel to the optical axis O and perpendicular to both the first direction x and the second direction y.

The first embodiment is explained.

Figure 3:
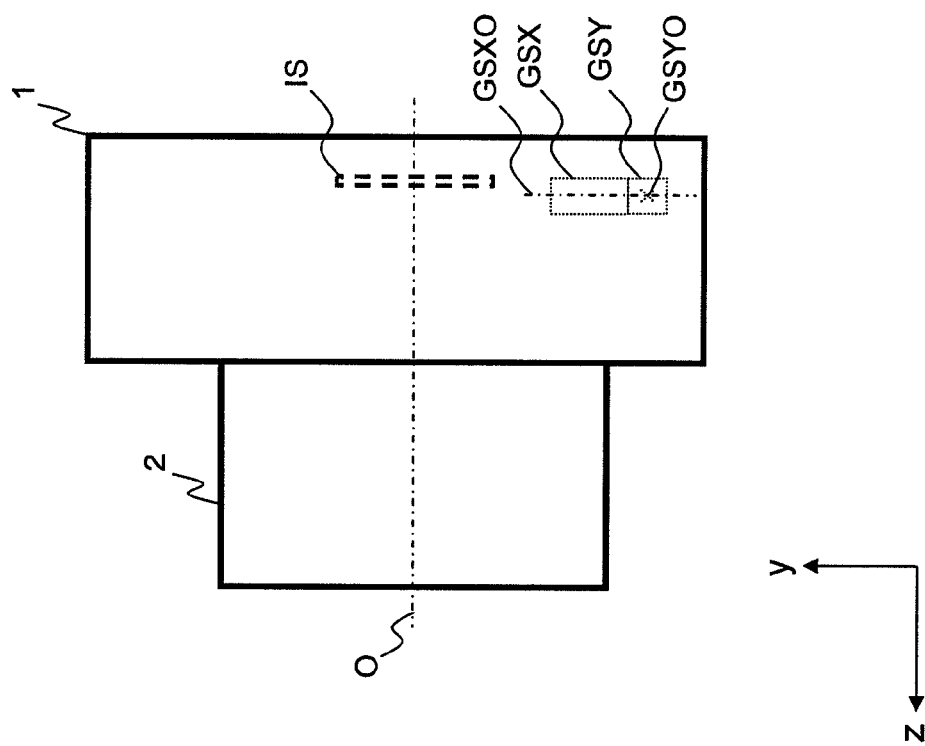
FIG. 3 is a side view of the photographing apparatus of the first embodiment.
Figure 4:
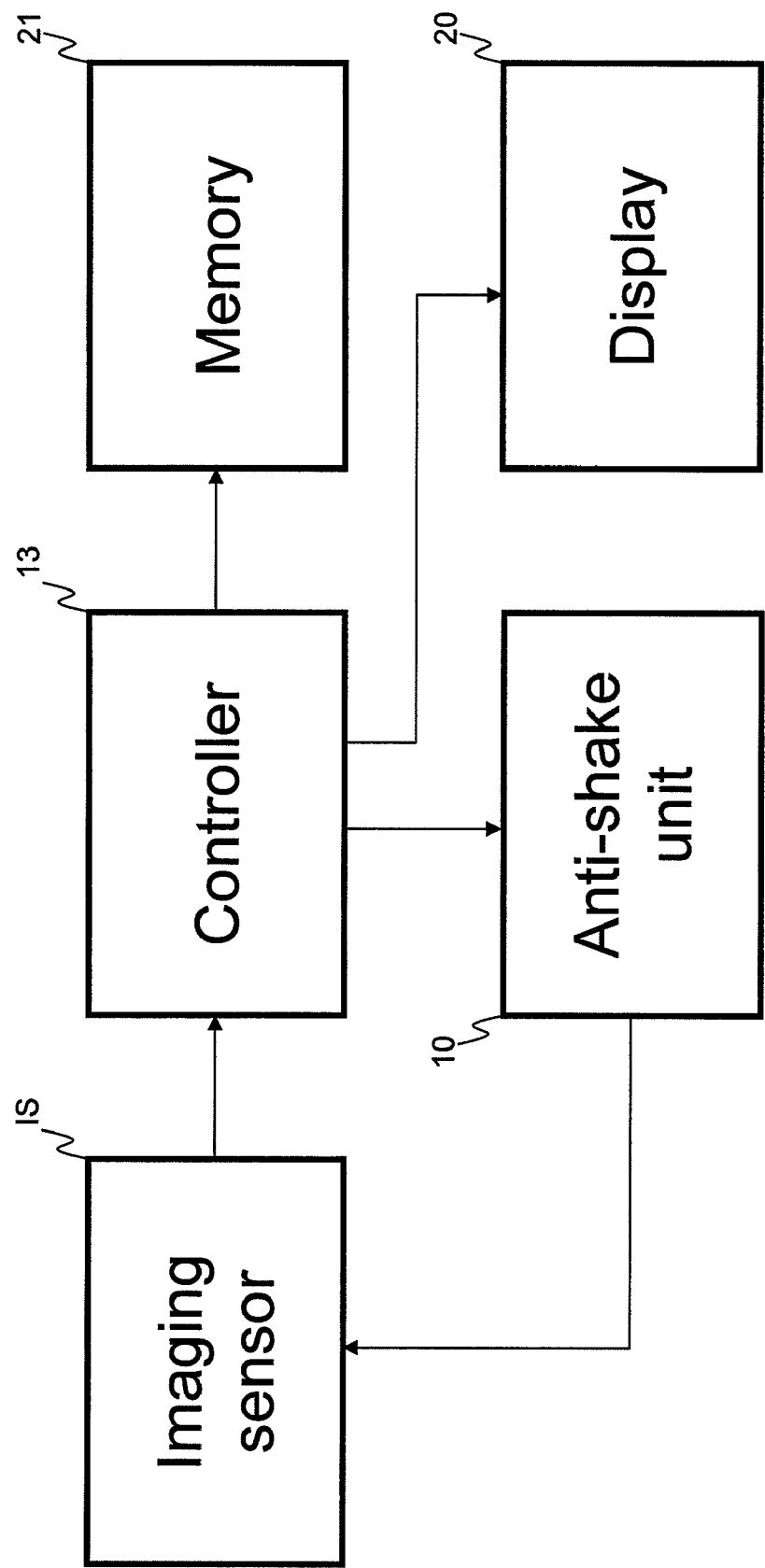
FIG. 4 is a construction diagram of the photographing apparatus of the first and second embodiments.

The photographing apparatus 1 has a lens barrel 2, and an imaging sensor IS (see FIGS. 1 to 3). The photographing apparatus 1 also has an anti-shake unit 10, a controller 13, a display 20, and a memory 21 (see FIGS. 4 and 5).

The photographic subject image is captured as an optical image through the photographing lens by the imaging sensor IS, such as a CCD etc., and the captured image is indicated on the display 20 after an A/D converting operation and an image processing operation have been completed by the controller 13.

Further, the image signal obtained by the imaging operation is stored in the memory 21.

The anti-shake unit 10 is an apparatus that reduces the effect of hand-shake, by moving a movable unit 15a, by canceling the lag corresponding to hand-shake quantity, of a photographic subject image on the imaging surface of the imaging sensor IS; and by stabilizing the photographic subject image that reaches the imaging surface of the imaging sensor IS.

The anti-shake unit 10 has a hand-shake quantity detector 11 that detects the quantity of hand-shake, and a driving unit 15 (an image blur correcting device) that moves the movable unit 15a in the xy plane (the reference plane) which is perpendicular to the optical axis O, based on the hand-shake quantity. The movement of the movable unit 15a is based on the quantity of hand-shake and is performed by the controller 13.

The hand-shake quantity detector 11 detects the hand-shake quantity by using an angular velocity sensor such as a gyro sensor, etc.

The controller 13 has a vertical error amplifier 63, a horizontal error amplifier 65, a vertical PID (Proportional, Integral, and Derivative Controls) calculating circuit 66, a horizontal PID calculating circuit 68, a vertical PWM driver 69, and a horizontal PWM driver 71, in order to perform the anti-shake operation by using PID control.

The driving unit 15 has the movable unit 15a and a fixed unit 15b (see FIGS. 6 to 11). The movable unit 15a is movable with regard to the fixed unit 15b that is fixed to the photographing apparatus 1, in the xy plane.

The movable unit 15a has a circuit board 45 to which the imaging sensor IS is attached, a horizontal driving coil CX, a vertical driving coil CY, a first horizontal frame connecting unit FXA, a second horizontal frame connecting unit FXB, a vertical hall sensor SY, and a horizontal hall sensor SX.

The fixed unit 15b has a rectangular frame 18, a first vertical frame fixing unit FYA, a second vertical frame fixing unit FYB, a horizontal driving and position-detecting yoke YX, a vertical driving and position-detecting yoke YY, a horizontal driving and position-detecting magnet MX, and a vertical driving and position-detecting magnet MY.

Figure 5:
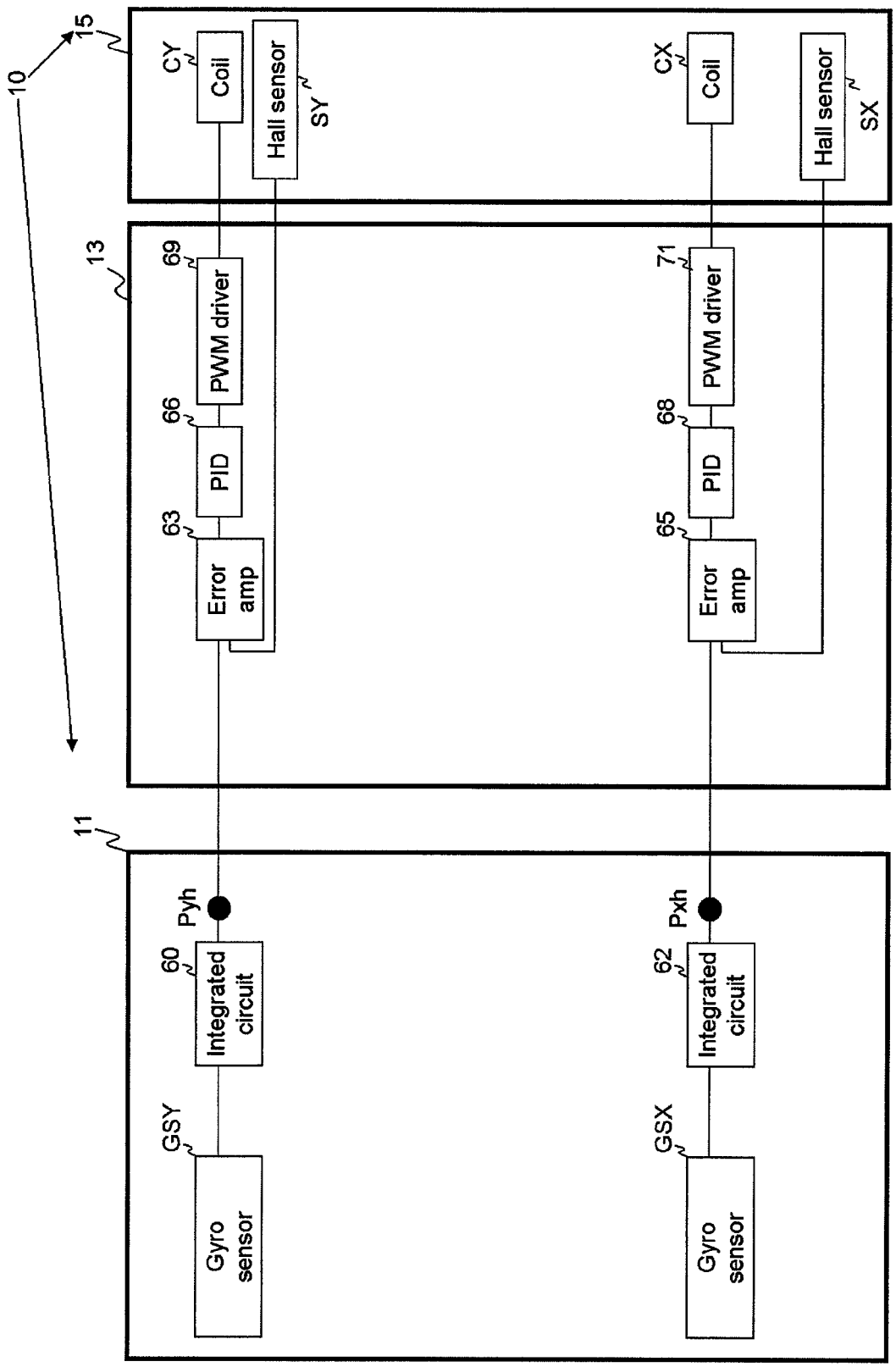
FIG. 5 is a circuit construction diagram of the anti-shake unit of the photographing apparatus of the first embodiment.
Figure 7:
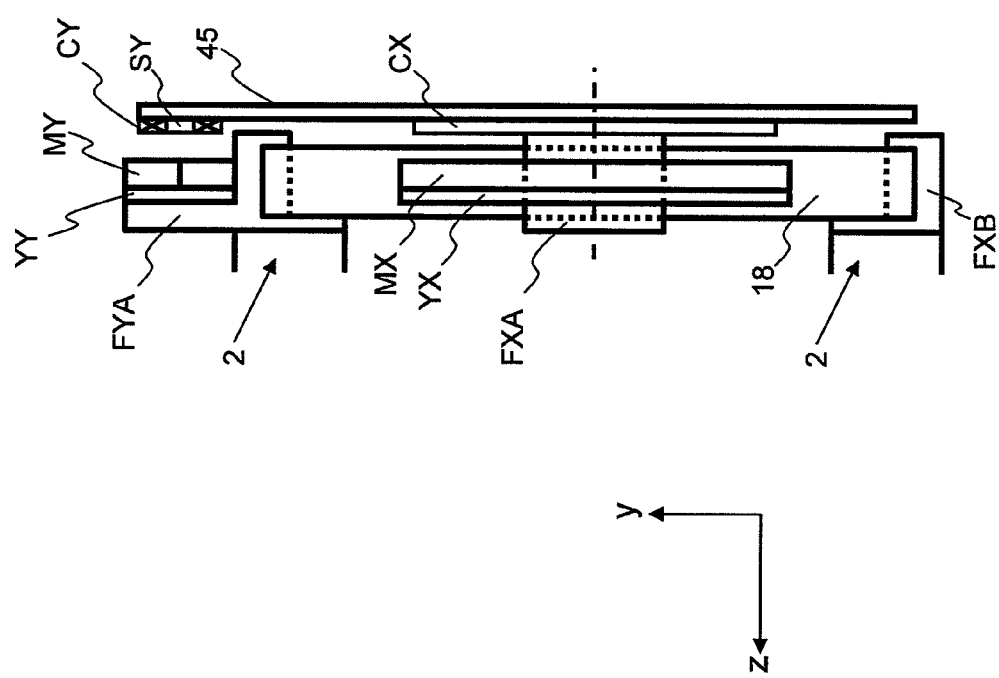
FIG. 7 is a side view of the driving unit of the anti-shake unit, viewed from the horizontal driving coil side, of the first embodiment.
Figure 8:
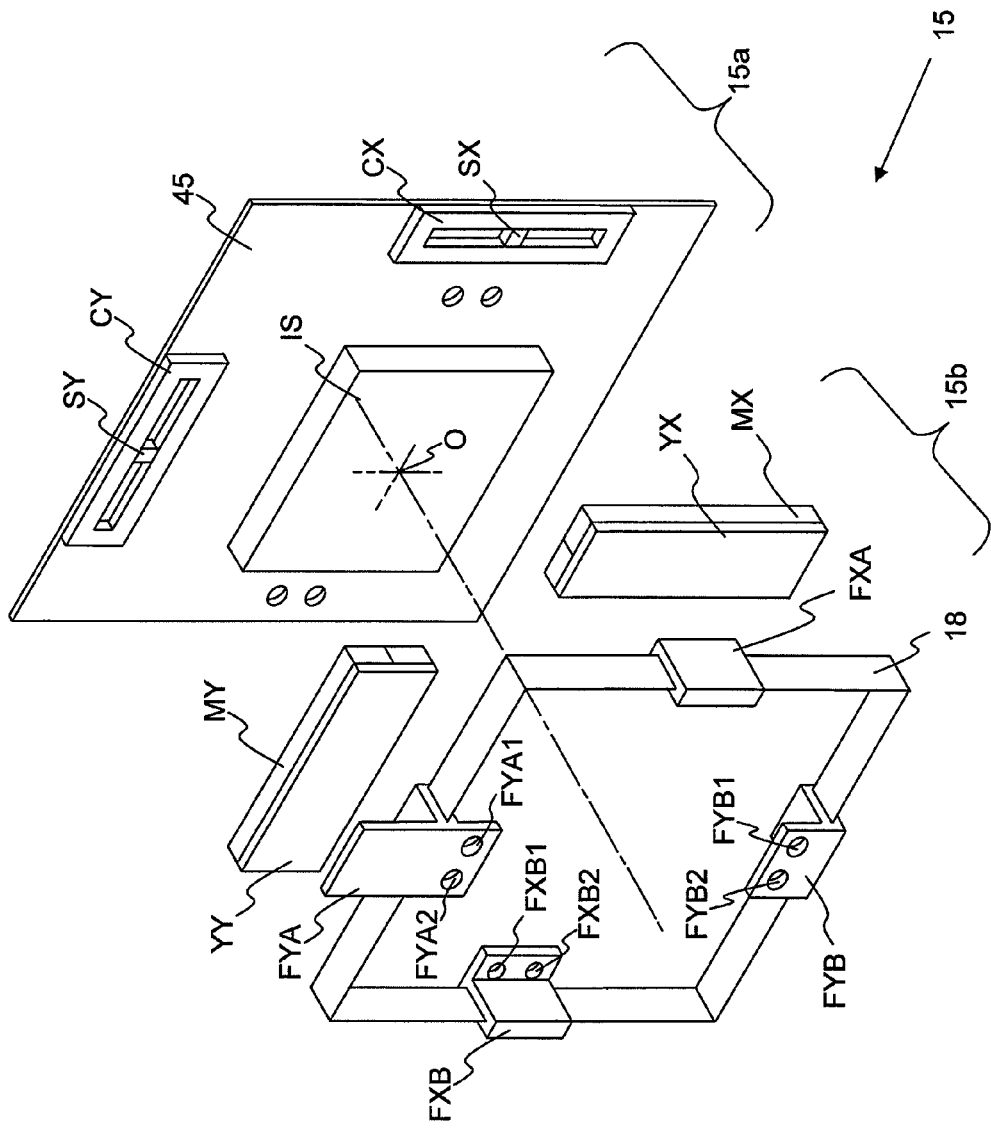
FIG. 8 is a decomposed perspective view of the driving unit of the first embodiment.

First of all, details of the hand-shake quantity detector 11 are explained (see FIG. 5). The hand-shake quantity detector 11 has a pitching gyro sensor GSY, a yawing gyro sensor GSX, a pitching integrated circuit 60, and a yawing integrated circuit 62.

The pitching gyro sensor GSY is arranged so that the gyro sensor axis GSYO of the pitching gyro sensor GSY is parallel to the first direction x, and detects the angular velocity of a rotary motion (the pitching motion) of the photographing apparatus 1 about the axis of the first direction x.

The yawing gyro sensor GSX is arranged so that the gyro sensor axis GSXO of the yawing gyro sensor GSX is parallel to the second direction y, and detects the angular velocity of a rotary motion (the yawing motion) of the photographing apparatus 1 about the axis of the second direction y.

The pitching integrated circuit 60 integrates a signal representing the angular velocity from the pitching gyro sensor GSY.

Based on the integrated signal, the pitching integrated circuit 60 generates a pitching angular signal Pyh as an output value corresponding to the angular hand-shake quantity based on the pitching motion.

The yawing integrated circuit 62 integrates a signal representing the angular velocity from the yawing gyro sensor GSX.

Based on the integrated signal, the yawing integrated circuit 62 generates a yawing angular signal Pxh as an output value corresponding to the angular hand-shake quantity based on the yawing motion.

The pitching angular signal Pyh is used for movement control of the movable unit 15a, based on the hand-shake quantity, by the controller 13, as a signal that specifies the hand-shake quantity based on the rotary motion (the pitching motion) about the axis of the first direction x.

The yawing angular signal Pxh is used for movement control of the movable unit 15a, based on the hand-shake quantity, by the controller 13, as a signal that specifies the hand-shake quantity based on the rotary motion (the yawing motion) about the axis of the second direction y.

Next, the detail of the controller 13 is explained (see FIG. 5). In the case where a CPU is used as the controller 13, the operation of the integrated circuit, the error amplifier, the PID calculating circuit, and the PWM driver can be performed by using software.

The pitching angular signal Pyh and an output value from the vertical hall sensor SY are input to the vertical error amplifier 63.

The yawing angular signal Pxh and an output value from the horizontal hall sensor SX are input to the horizontal error amplifier 65.

The vertical error amplifier 63 calculates the differential value between the pitching angular signal Pyh and the output value of the vertical hall sensor SY.

The horizontal error amplifier 65 calculates the differential value between the yawing angular signal Pxh and the output value of the horizontal hall sensor SX.

The vertical PID calculating circuit 66 performs a PID calculation based on the output value of the vertical error amplifier 63.

Specifically, the vertical PID calculating circuit 66 computes a voltage value to supply to the vertical driving coil CY to generate a PWM pulse duty ratio that effectively reduces the differential value between the pitching angular signal Pyh and the output value of the vertical hall sensor SY (effectively reducing the output value of the vertical error amplifier 63).

The vertical PWM driver 69 applies a PWM pulse based on the effect of the calculation of the vertical PID calculating circuit 66, to the vertical driving coil CY.

At the vertical driving coil CY, a driving force resulting from the application of the PWM pulse occurs in the second direction y, so that the movable unit 15a can be moved in the second direction y in the xy plane, based on the driving force in the second direction y.

The horizontal PID calculating circuit 68 performs a PID calculation based on the output value of the horizontal error amplifier 65.

Specifically, the horizontal PID calculating circuit 68 computes a voltage value to supply to the horizontal driving coil CX to generate a PWM pulse duty ratio that effectively reduces the differential value between the yawing angular signal Pxh and the output value of the horizontal hall sensor SX (effectively reducing the output value of the horizontal error amplifier 65).

The horizontal PWM driver 71 applies a PWM pulse based on the effect of the calculation of the horizontal PID calculating circuit 68, to the horizontal driving coil CX.

At the horizontal driving coil CX, a driving force resulting from the application of the PWM pulse occurs in the first direction x, so that the movable unit 15a can be moved in the first direction x in the xy plane, based on the driving force in the first direction x.

Next, the detail of the driving unit 15 is explained (see FIGS. 6 to 11). The horizontal driving coil CX, the vertical driving coil CY, the first horizontal frame connecting unit FXA, the second horizontal frame connecting unit FXB, the vertical hall sensor SY, and the horizontal hall sensor SX are attached to the circuit board 45.

The rectangular frame 18 is a frame (ring) that is composed of four thin strips that are perpendicular to the xy plane, are a rectangular shape whose inside is hollow when viewed from the third direction z, and are non-magnetic elastic members. The strips have a predetermined width, which is orientated in a direction perpendicular to the xy plane.

It is desirable that the four strips which form the rectangular frame 18 are made from one body. For example, the rectangular frame 18 is made by bending one long, thin strip and welding the two ends of the strip together, or by forming a section of tubular member into the rectangular shape.

The two strips of the rectangular frame 18 that face each other in the first direction x are attached to (connected to) the circuit board 45 with the first and second horizontal frame connecting units FXA and FXB. The other two strips of the rectangular frame 18 that face each other in the second direction y are attached to (fixed to) the fixed unit 15b (the lens barrel 2) with the first and second vertical frame fixing units FYA and FYB. The rectangular frame 18 surrounds the imaging sensor IS, or the imaging sensor IS is located in the inner side of the rectangular frame 18.

The first horizontal frame connecting unit FXA is attached to the circuit board 45 with tightening screws through the first horizontal frame connecting holes FXA1 and FXA2.

The second horizontal frame connecting unit FXB is attached to the circuit board 45 with tightening screws through the second horizontal frame connecting holes FXB1 and FXB2.

The first vertical frame fixing unit FYA is attached to the lens barrel 2 with tightening screws through the first vertical frame fixing holes FYA1 and FYA2.

The second vertical frame fixing unit FYB is attached to the lens barrel 2 with tightening screws through the second vertical frame fixing holes FYB1 and FYB2.

The rectangular frame 18 has a rectangular shape that has two horizontal sides parallel to the first direction x and two vertical sides parallel to the second direction y, when viewed from the third direction z. However, this rectangular shape is transformed elastically in the xy plane, corresponding to the movement of the circuit board 45 in the xy plane. Accordingly, the circuit board 45 is movably supported in the xy plane by the fixed unit 15b and lens barrel 2 through the rectangular frame 18.

Figure 10:
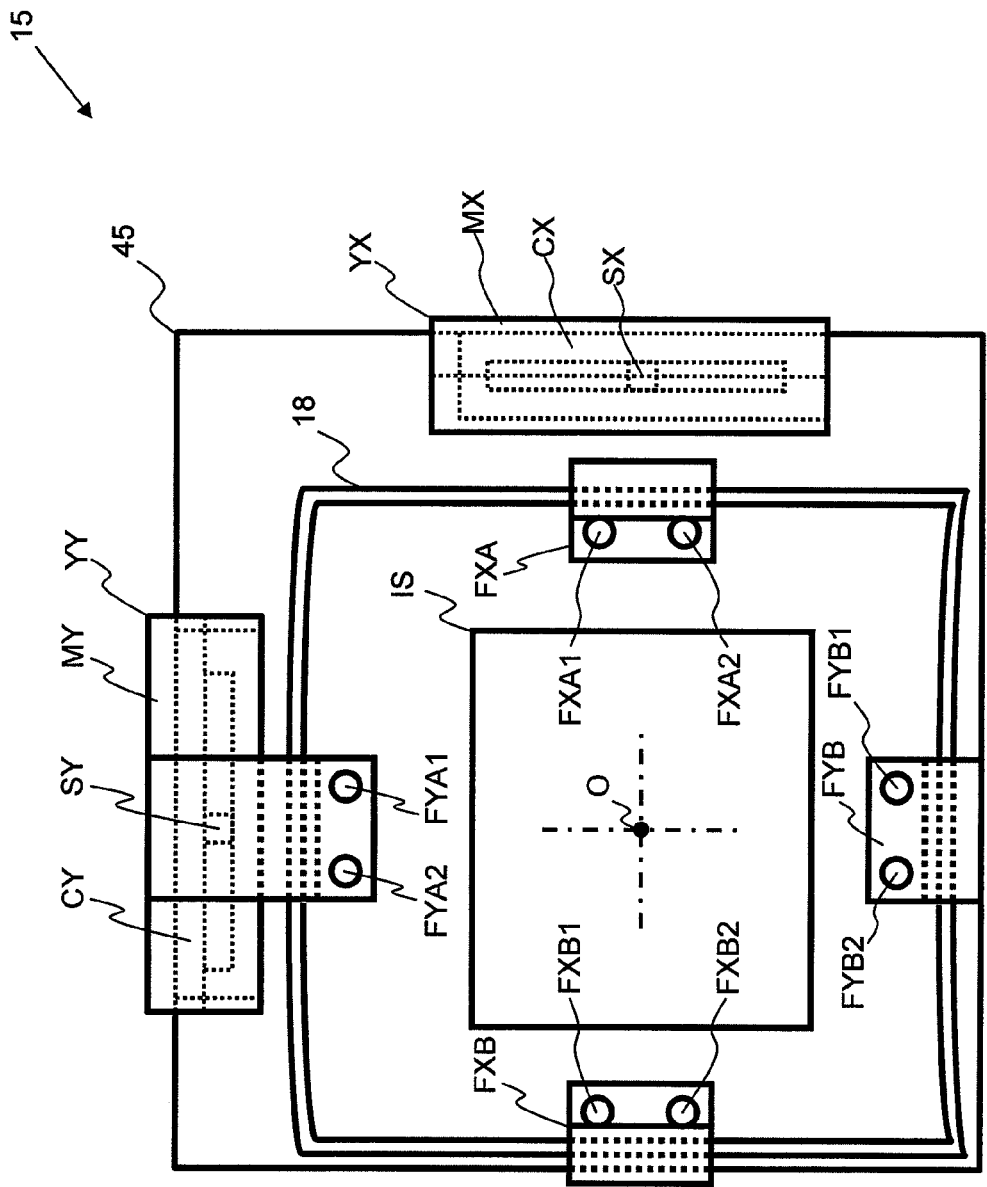
FIG. 10 is a front view of the driving unit of the anti-shake unit where the circuit board is moved downwards in the second direction y in the first embodiment.

FIG. 10 indicates a state where the circuit board 45 is moved downwards in the second direction y compared to the state shown in FIG. 6, which is an initial state.

Figure 11:
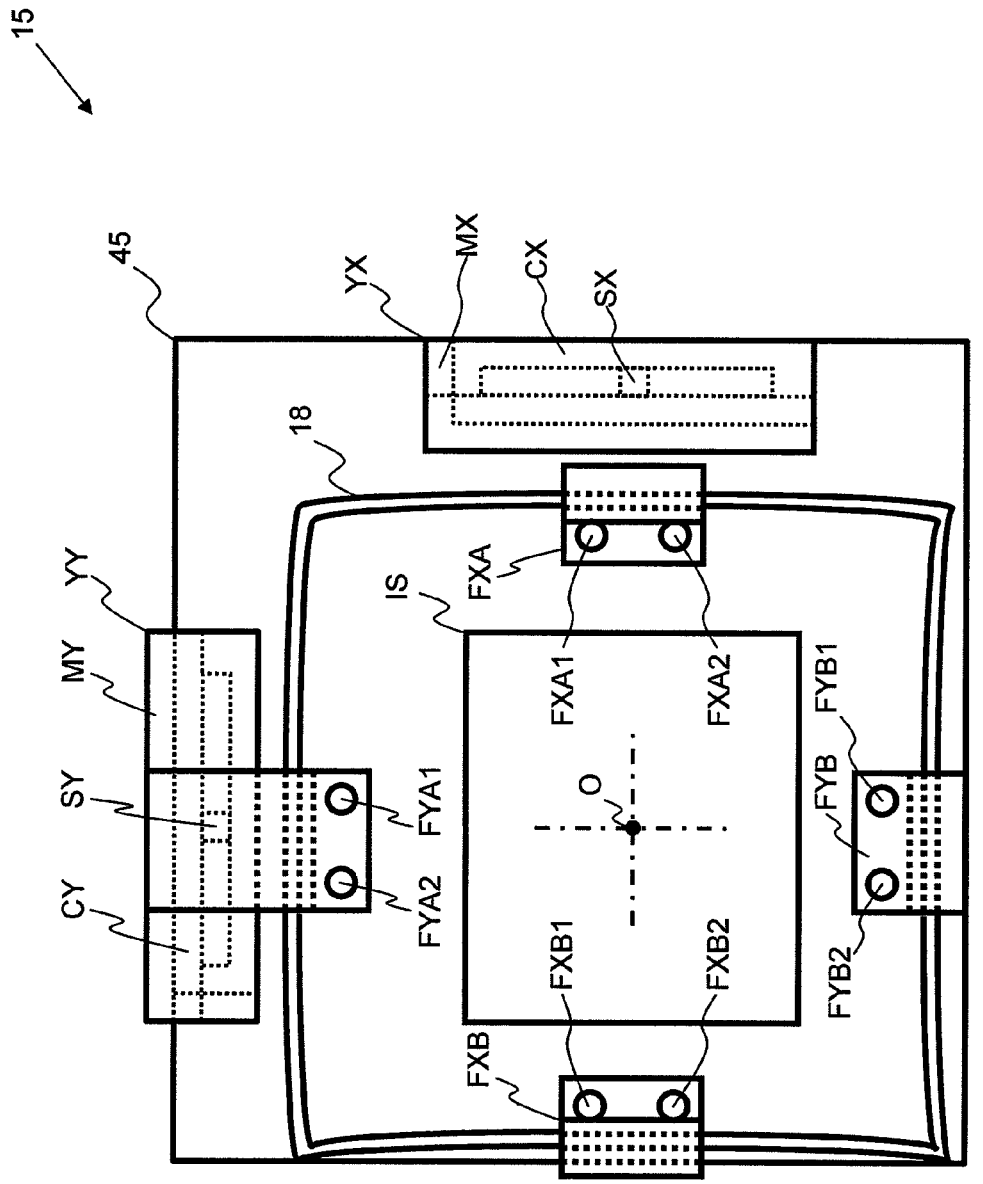
FIG. 11 is a front view of the driving unit of the anti-shake unit where the circuit board is moved to the right in the first direction x and downwards in the second direction y in the first embodiment.
Figure 12:
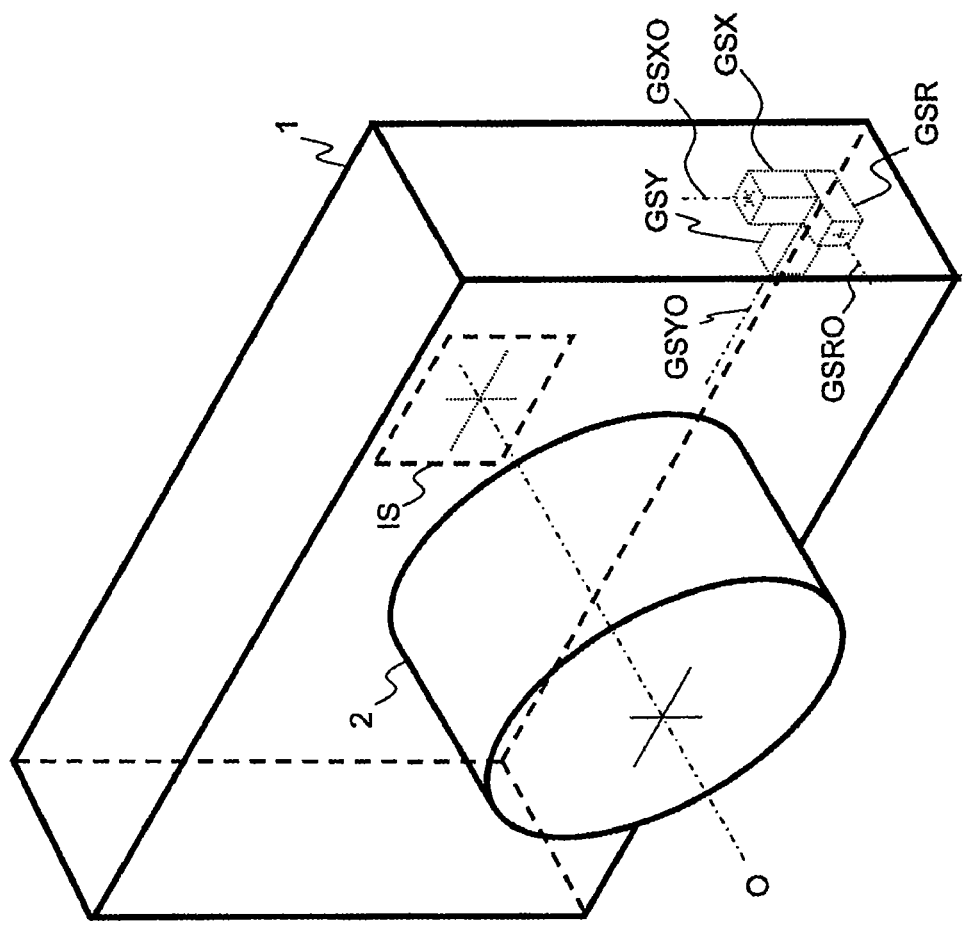
FIG. 12 is a perspective view of a photographing apparatus of the second embodiment, viewed from the front side of the photographing apparatus.
Figure 13:
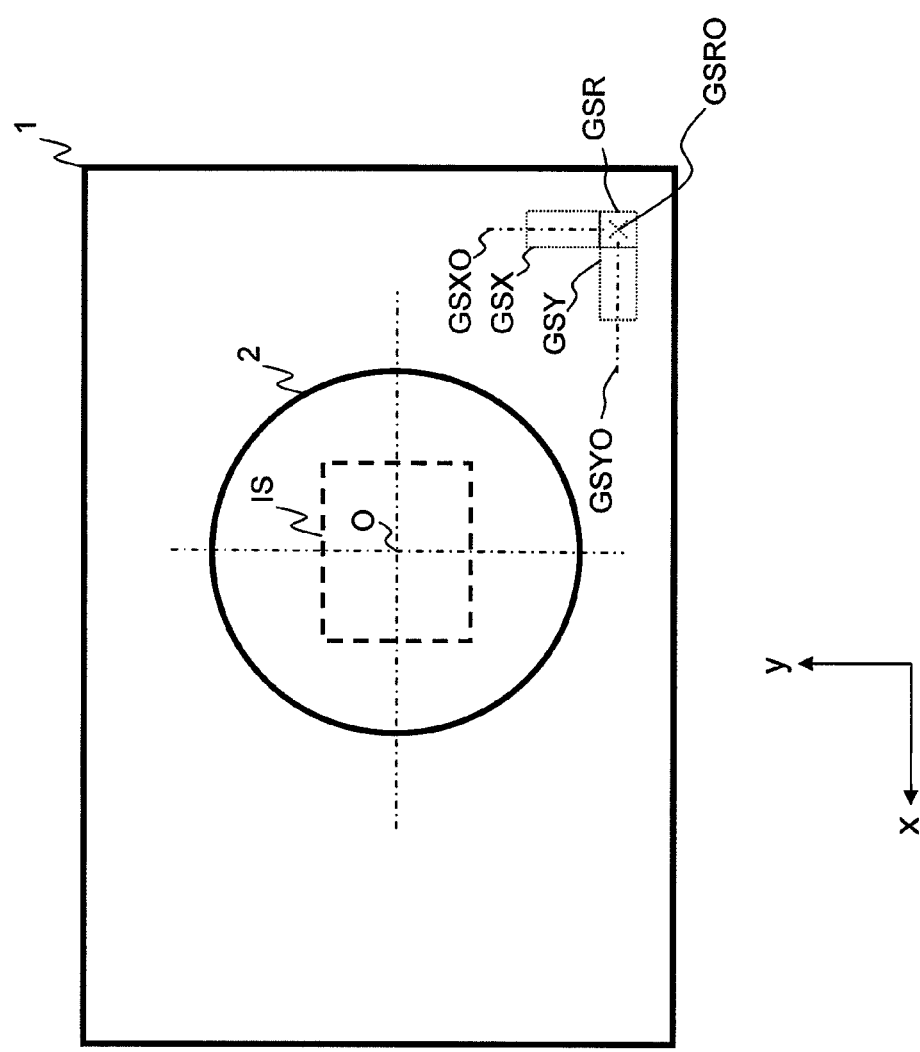
FIG. 13 is a front view of the photographing apparatus of the second embodiment.
Figure 14:
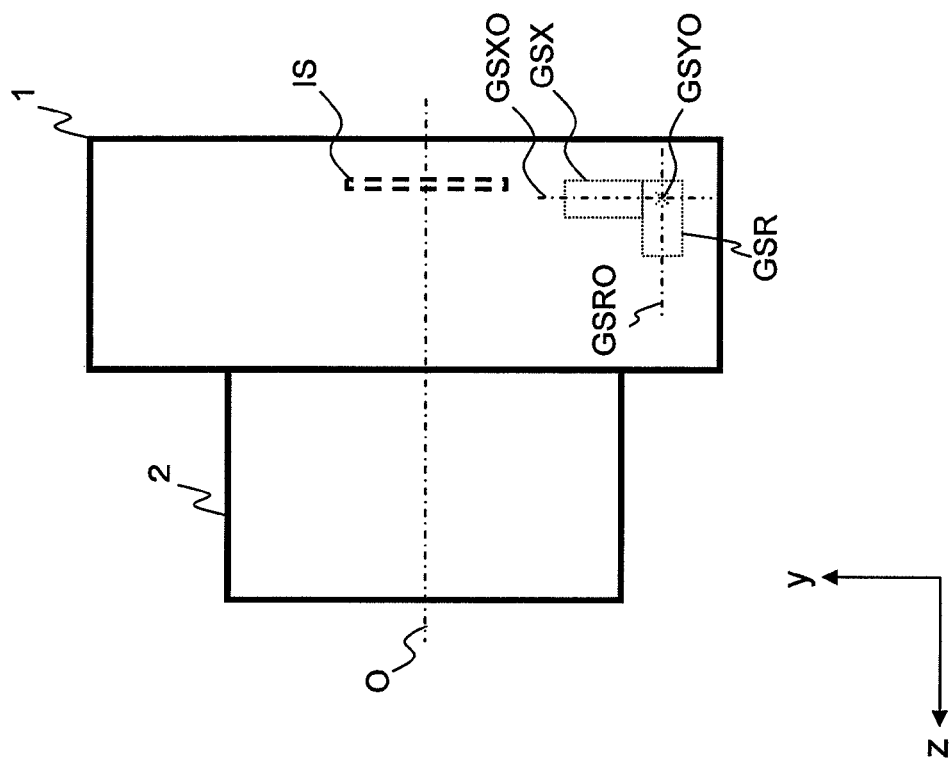
FIG. 14 is a side view of the photographing apparatus of the second embodiment.

FIG. 11 indicates a state where the circuit board 45 is moved to the right in the first direction x, when viewed from the lens barrel 2 side, compared to the state shown in FIG. 10.

When the movement of the circuit board 45 commences, the first and second horizontal frame connecting units FXA and FXB, which are connected to the movable unit 15a (the circuit board 45), are moved with the circuit board 45. However, the first and second vertical frame fixing units FYA and FYB which are fixed to the fixed unit 15b are not moved with the circuit board 45. Accordingly, the rectangular frame 18 is transformed elastically by the first and second horizontal frame connecting units FXA and FXB which are moved, and the first and second vertical frame fixing units FYA and FYB, which are not moved.

For example, when the circuit board 45 is moved downwards in the second direction y, the first and second horizontal frame connecting units FXA and FXB are moved downwards in the second direction y so that the two horizontal sides parallel to the first direction x of the rectangular frame 18, when viewed from the third direction z, are transformed elastically, and the middle parts of the two horizontal sides are elastically projected upwards to form a convex. However, the two vertical sides parallel to the second direction y of the rectangular frame 18, when viewed from the third direction z, are barely transformed (see FIG. 10).

Further, when the circuit board 45 is moved to the right in the first direction x, when viewed from the lens barrel 2 side, the first and second horizontal frame connecting units FXA and FXB are moved to the right in the first direction x so that the two vertical sides parallel to the second direction y of the rectangular frame 18, when viewed from the third direction z, are transformed elastically, and the middle parts of the two vertical sides are elastically projected to the right to form a convex. However, the two horizontal sides parallel to the first direction x of the rectangular frame 18, when viewed from the third direction, z are barely transformed.

Further, when the circuit board 45 is moved to the right in the first direction x, when viewed from the lens barrel 2 side, and downwards in the second direction y, the first and second horizontal frame connecting units FXA and FXB are moved to the right in the first direction x and downwards in the second direction y so that the two horizontal sides parallel to the first direction x of the rectangular frame 18, when viewed from the third direction z, are transformed elastically, and the middle parts of the two horizontal sides are elastically projected upwards to form a convex, and the two vertical sides parallel to the second direction y of the rectangular frame 18, when viewed from the third direction z, are transformed elastically, and the middle parts of the two vertical sides are elastically projected to the right to form a convex (see FIG. 11).

The first horizontal frame connecting unit FXA is attached to the center area of one of the two vertical sides (strips), parallel to the second direction y, of the rectangular frame 18.

The second horizontal frame connecting unit FXB is attached to the center area of the other of the two vertical sides (strips), parallel to the second direction y, of the rectangular frame 18.

The imaging sensor IS is arranged between the first and second horizontal frame connecting units FXA and FXB in the first direction x, when viewed from the third direction z.

The first vertical frame fixing unit FYA is attached to the center area of one of the two horizontal sides (strips) parallel to the first direction x of the rectangular frame 18.

The second vertical frame fixing unit FYB is attached to the center area of the other of the two horizontal sides (strips) parallel to the first direction x of the rectangular frame 18.

The imaging sensor IS is arranged between the first and second vertical frame fixing units FYA and FYB in the second direction y, when viewed from the third direction z.

The rectangular frame 18 is made from non-magnetic metal, and at least parts of the first and second horizontal frame connecting units FXA and FXB and the first and second vertical frame fixing units FYA and FYB are made from resin.

The rectangular frame 18, the first horizontal frame connecting unit FXA, the second horizontal frame connecting unit FXB, the first vertical frame fixing unit FYA, and the second vertical frame fixing unit FYB are formed by insert molding.

In the case that the rectangular frame 18 is made from resin, the first horizontal frame connecting unit FXA, the second horizontal frame connecting unit FXB, the first vertical frame fixing unit FYA, and the second vertical frame fixing unit FYB may be formed by united molding.

The horizontal driving and position-detecting yoke YX and the vertical driving and position-detecting yoke YY are board-shaped metallic magnetic members.

The horizontal driving and position-detecting yoke YX is arranged perpendicular to the third direction z, and attached (glued) to the lens barrel 2 on the right side when viewed from the third direction z and the lens barrel 2 side.

The vertical driving and position-detecting yoke YY is arranged perpendicular to the third direction z, and attached (glued) to the first vertical frame fixing unit FYA on the top side when viewed from the third direction z and the lens barrel 2 side.

The horizontal driving and position-detecting magnet MX is attached to the horizontal driving and position-detecting yoke YX. The vertical driving and position-detecting magnet MY is attached to the vertical driving and position-detecting yoke YY.

In an initial state before the movable unit 15a starts to move, under the condition where it is not affected by gravity, namely when the imaging surface of the imaging sensor IS lies parallel to the horizontal plane (is facing upwards or downwards), it is desirable to have the circuit board 45 arranged such that the optical axis O passes through the center of the effective imaging field of the imaging sensor IS, and that the rectangular frame 18 is not transformed elastically and forms a rectangular shape.

The imaging sensor IS is arranged at the side of the circuit board 45 that faces the lens barrel 2.

The horizontal driving coil CX and the horizontal hall sensor SX face the horizontal driving and position-detecting magnet MX in the third direction z.

The vertical driving coil CY and the vertical hall sensor SY face the vertical driving and position-detecting magnet MY in the third direction z.

The horizontal driving and position-detecting magnet MX is magnetized in the third direction z (in the thickness direction), and the N pole and S pole of the horizontal driving and position-detecting magnet MX are arranged in the first direction x.

The length of the horizontal driving and position-detecting magnet MX in the second direction y is longer in comparison with the effective length of the horizontal driving coil CX in the second direction y, so that the horizontal driving coil CX and the horizontal driving sensor SX remain in a constant magnetic field throughout the movable unit's 15a full range of motion in the second direction y.

The vertical driving and position-detecting magnet MY is magnetized in the third direction z (in the thickness direction), and the N pole and S pole of the vertical driving and position-detecting magnet MY are arranged in the second direction y.

The length of the vertical driving and position-detecting magnet MY in the first direction x is longer in comparison with the effective length of the vertical driving coil CY in the first direction x, so that the vertical driving coil CY and the vertical hall sensor SY remain in a constant magnetic field throughout the movable unit's 15a full range of motion in the first direction x.

The coil pattern of the horizontal driving coil CX has a line segment which is parallel to the second direction y, so that the movable unit 15a, which includes the horizontal driving coil CX, moves in the first direction x when a horizontal electro-magnetic force is applied.

The horizontal electro-magnetic force occurs on the basis of the current that flows through the horizontal driving coil CX and the magnetic field of the horizontal driving and position-detecting magnet MX.

The coil pattern of the vertical driving coil CY has a line segment which is parallel to the first direction x, so that the movable unit 15a, which includes the vertical driving coil CY, moves in the second direction y when a vertical electro-magnetic force is applied.

The vertical electro-magnetic force occurs on the basis of the current that flows through the vertical driving coil CY and the magnetic field of the vertical driving and position-detecting magnet MY.

The vertical hall sensor SY is a magneto-electric converting element (a magnetic field change-detection element) utilizing the Hall effect, and is used for detecting the position of the movable unit 15a in the second direction y by detecting a change in the magnetic-flux density from the vertical driving and position-detecting magnet MY, corresponding to a position change of the movable unit 15a in the second direction y.

The horizontal hall sensor SX is a magneto-electric converting element (a magnetic field change-detection element) utilizing the Hall effect, and is used for detecting the position of the movable unit 15a in the first direction x by detecting a change in the magnetic-flux density from the horizontal driving and position-detecting magnet MX, corresponding to a position change of the movable unit 15a in the first direction x.

The vertical hall sensor SY is arranged inside the vertical driving coil CY and the horizontal hall sensor SX is arranged inside the horizontal driving coil CX.

The horizontal driving and position-detecting yoke YX prevents the magnetic field of the horizontal driving and position-detecting magnet MX from diffusing, and increases the magnetic-flux density between the horizontal driving coil CX and horizontal hall sensor SX, and the horizontal driving and position-detecting magnet MX.

The vertical driving and position-detecting yoke YY prevents the magnetic field of the vertical driving and position-detecting magnet MY from diffusing, and increases the magnetic-flux density between the vertical driving coil CY and vertical hall sensor SY, and the vertical driving and position-detecting magnet MY.

In the first embodiment, the movable unit 15a can be movably supported in the xy plane through the elastic transformation of the rectangular frame 18, without a guide mechanism or a mechanism that supports the movable unit 15a by using a ball. Therefore, because it is not necessary to consider a gap and wear based on the clearance of the guide mechanism, a highly accurate and highly stable anti-shake operation can be performed.

Further, the construction can be simplified compared to when a plurality of elastic members are used for movably supporting the movable unit 15a, and united molding or insert molding can be used, the cost of production can be reduced.

In the first embodiment, elastic transformation of the rectangular frame 18 is used to move the movable unit 15a. However, to consider the elastic force of the rectangular frame 18 for the movement control of the movable unit 15a is not necessary, because the movement control method (the PID calculation of the controller 13) is a feedback control method that calculates the movement quantity (the driving force) required to move to the next position of the movable unit 15a on the basis of information regarding its present position; so it is not necessary to perform a complex calculation considering the elastic force.

Next, the second embodiment is explained. In the first embodiment, the movable unit 15a is movably supported in the xy plane by the rectangular frame 18. However, in the second embodiment, the movable unit 15a is movably and rotatably supported in the xy plane by the rectangular frame 18. The points that differ from the first embodiment are explained (see FIGS. 12 to 18).

The anti-shake unit 10 is an apparatus that reduces the effect of hand-shake, by linearly moving and rotating a movable unit 15a (a linear movement in the first direction x and the second direction y, and a rotary movement in the xy plane), by canceling the lag corresponding to hand-shake quantity, of a photographic subject image on the imaging surface of the imaging sensor IS, and by stabilizing the photographic subject image that reaches the imaging surface of the imaging sensor IS.

The anti-shake unit 10 has a hand-shake quantity detector 11 that detects the quantity of hand-shake, and a driving unit 15 that moves the movable unit 15a, including a rotation of the movable unit 15a in the xy plane (the reference plane) which is perpendicular to the optical axis O, based on the hand-shake quantity. The movement of the movable unit 15a is based on the quantity of hand-shake and is performed by the controller 13.

The hand-shake quantity detector 11 detects the hand-shake quantity by using an angular velocity sensor such as a gyro sensor etc.

The controller 13 has a first vertical error amplifier 63A, a second vertical error amplifier 63B, a horizontal error amplifier 65, a first vertical PID (Proportional, Integral, and Derivative Controls) calculating circuit 66A, a second vertical PID calculating circuit 66B, a horizontal PID calculating circuit 68, a first vertical PWM driver 69A, a second vertical PWM driver 69B, and a horizontal PWM driver 71, in order to perform the anti-shake operation by using PID control.

The driving unit 15 has the movable unit 15a and a fixed unit 15b. The movable unit 15a is linearly movable and rotatable with regard to the fixed unit 15b that is fixed to the photographing apparatus 1, in the xy plane.

The movable unit 15a has a circuit board 45 to which the imaging sensor IS is attached, a first horizontal driving coil CXA, a second horizontal driving coil CXB, a first vertical driving coil CYA, a second vertical driving coil CYB, a first horizontal frame connecting unit FXA, a second horizontal frame connecting unit FXB, a first vertical hall sensor SYA, a second vertical hall sensor SYB, and a horizontal hall sensor SX.

The fixed unit 15b has a rectangular frame 18, a first vertical frame fixing unit FYA, a second vertical frame fixing unit FYB, a first horizontal driving and position-detecting yoke YXA, a second horizontal driving and position-detecting yoke YXB, a vertical driving and position-detecting yoke YY, a first horizontal driving and position-detecting magnet MXA, a second horizontal driving and position-detecting magnet MXB, a first vertical driving and position-detecting magnet MYA, and a second vertical driving and position-detecting magnet MYB.

Figure 15:
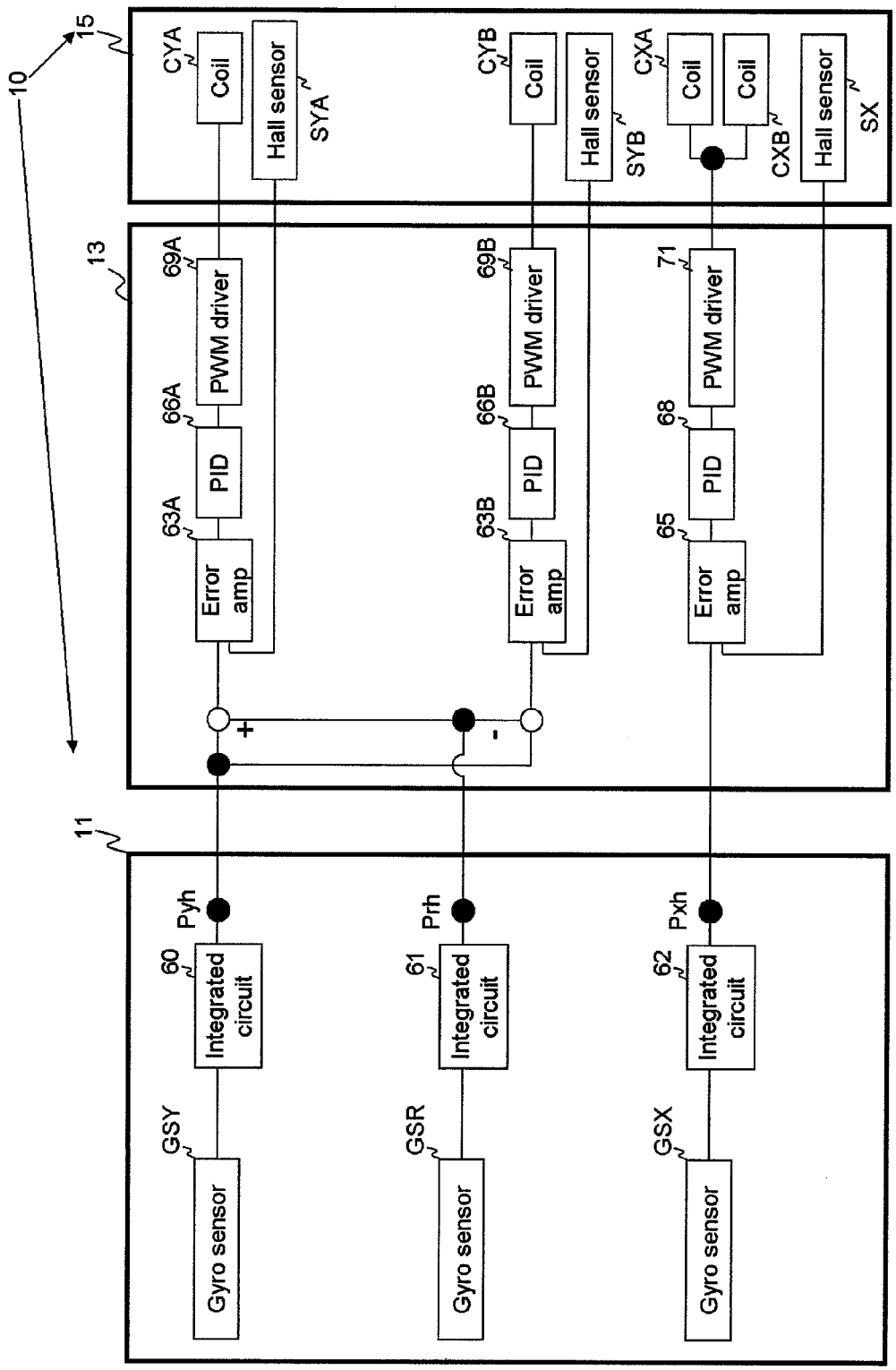
FIG. 15 is a circuit construction diagram of the anti-shake unit of the photographing apparatus of the second embodiment.

First of all, details of the hand-shake quantity detector 11 are explained (see FIG. 15). The hand-shake quantity detector 11 has a pitching gyro sensor GSY, a rolling gyro sensor GSR, a yawing gyro sensor GSX, a pitching integrated circuit 60, a rolling integrated circuit 61, and a yawing integrated circuit 62.

The pitching gyro sensor GSY is arranged so that the gyro sensor axis GSYO of the pitching gyro sensor GSY is parallel to the first direction x, and detects the angular velocity of a rotary motion (the pitching motion) of the photographing apparatus 1 about the axis of the first direction x.

The rolling gyro sensor GSR is arranged so that the gyro sensor axis GSRO of the rolling gyro sensor GSR is parallel to the third direction z, and detects the angular velocity of a rotary motion (the rolling motion) of the photographing apparatus 1 about the axis of the third direction z.

The yawing gyro sensor GSX is arranged so that the gyro sensor axis GSXO of the yawing gyro sensor GSX is parallel to the second direction y, and detects the angular velocity of a rotary motion (the yawing motion) of the photographing apparatus 1 about the axis of the second direction y.

The pitching integrated circuit 60 integrates a signal representing the angular velocity from the pitching gyro sensor GSY.

Based on the integrated signal, the pitching integrated circuit 60 generates a pitching angular signal Pyh as an output value corresponding to the angular hand-shake quantity based on the pitching motion.

The rolling integrated circuit 61 integrates a signal representing the angular velocity from the rolling gyro sensor GSR.

Based on the integrated signal, the rolling integrated circuit 61 generates a rolling angular signal Prh as an output value corresponding to the angular hand-shake quantity based on the rolling motion.

The yawing integrated circuit 62 integrates a signal representing the angular velocity from the yawing gyro sensor GSX.

Based on the integrated signal, the yawing integrated circuit 62 generates a yawing angular signal Pxh as an output value corresponding to the angular hand-shake quantity based on the yawing motion.

The pitching angular signal Pyh is used for movement control of the movable unit 15a, based on the hand-shake quantity, by the controller 13, as a signal that specifies the hand-shake quantity based on the rotary motion (the pitching motion) about the axis of the first direction x.

The rolling angular signal Prh is used for movement control of the movable unit 15a, based on the hand-shake quantity, by the controller 13, as a signal that specifies the hand-shake quantity based on the rotary motion (the rolling motion) about the axis of the third direction z.

The yawing angular signal Pxh is used for movement control of the movable unit 15a, based on the hand-shake quantity, by the controller 13, as a signal that specifies the hand-shake quantity based on the rotary motion (the yawing motion) about the axis of the second direction y.

Next, the detail of the controller 13 is explained. In the case where a CPU is used as the controller 13, the operation of the integrated circuit, the error amplifier, the PID calculating circuit, and the PWM driver can be performed by using software.

The pitching angular signal Pyh and the rolling angular signal Prh are input to the first vertical error amplifier 63A. The pitching angular signal Pyh and the rolling angular signal Prh are input to the second vertical error amplifier 63B.

The total value of the pitching angular signal Pyh and the rolling angular signal Prh, and an output value from the first vertical hall sensor SYA, are input to the first vertical error amplifier 63A.

The differential value between the pitching angular signal Pyh and the rolling angular signal Prh, and an output value from the second vertical hall sensor SYB are input to the second vertical error amplifier 63B.

The yawing angular signal Pxh and an output value from the horizontal hall sensor SX are input to the horizontal error amplifier 65.

The first vertical error amplifier 63A compares the total value of the pitching angular signal Pyh and the rolling angular signal Prh with the output value of the first vertical hall sensor SYA. Specifically, the first vertical error amplifier 63A calculates a differential value between this total value of the angular signals Pyh and Prh and this output value of the hall sensor SYA.

The second vertical error amplifier 63B compares the differential value between the pitching angular signal Pyh and the rolling angular signal Prh with the output value of the second vertical hall sensor SYB. Specifically, the second vertical error amplifier 63B calculates a differential value between this differential value of the angular signals Pyh and Prh and this output value of the hall sensor SYB.

The horizontal error amplifier 65 calculates the differential value between the yawing angular signal Pxh and the output value of the horizontal hall sensor SX.

The first vertical PID calculating circuit 66A performs a PID calculation based on the output value of the first vertical error amplifier 63A.

The second vertical PID calculating circuit 66B performs a PID calculation based on the output value of the second vertical error amplifier 63B.

Specifically, the first vertical PID calculating circuit 66A computes a voltage value to supply to the first vertical driving coil CYA to generate a PWM pulse duty ratio that effectively reduces the differential value between the total integrated value of the angular signals Pyh and Prh and the output value of the hall sensor SYA (effectively reducing the output value of the first vertical error amplifier 63A).

The second vertical PID calculating circuit 66B computes a voltage value to supply to the second vertical driving coil CYB to generate a PWM pulse duty ratio that effectively reduces the differential value between the differential value of the angular signals Pyh and Prh and the output value of the hall sensor SYB (effectively reducing the output value of the second vertical error amplifier 63B).

The first vertical PWM driver 69A applies a PWM pulse based on the effect of the calculation of the first vertical PID calculating circuit 66A, to the first vertical driving coil CYA.

The second vertical PWM driver 69B applies a PWM pulse based on the effect of the calculation of the second vertical PID calculating circuit 66B, to the second vertical driving coil CYB.

At the first and second vertical driving coils CYA and CYB, driving forces resulting from the application of the PWM pulse occur in the second direction y, so that the movable unit 15a can be moved in the second direction y in the xy plane, based on the driving forces in the second direction y.

When the driving force that occurs in the first vertical driving coil CYA is different from the driving force that occurs in the second vertical driving coil CYB, the movable unit 15a is rotated in the xy plane, based on the differential between the driving forces in the second direction y.

The horizontal PID calculating circuit 68 performs a PID calculation based on the output value of the horizontal error amplifier 65.

Specifically, the horizontal PID calculating circuit 68 computes a voltage value to supply to the first and second horizontal driving coils CXA and CXB to generate a PWM pulse duty ratio that effectively reduces the differential value between the yawing angular signal Pxh and the output value of the horizontal hall sensor SX (effectively reducing the output value of the horizontal error amplifier 65).

The horizontal PWM driver 71 applies a PWM pulse based on the effect of the calculation of the horizontal PID calculating circuit 68, to the first and second horizontal driving coils CXA and CXB.

At the first and second horizontal driving coils CXA and CXB, a driving force resulting from the application of the PWM pulse occurs in the first direction x, so that the movable unit 15a can be moved in the first direction x in the xy plane, based on the driving force in the first direction x.

Figure 16:
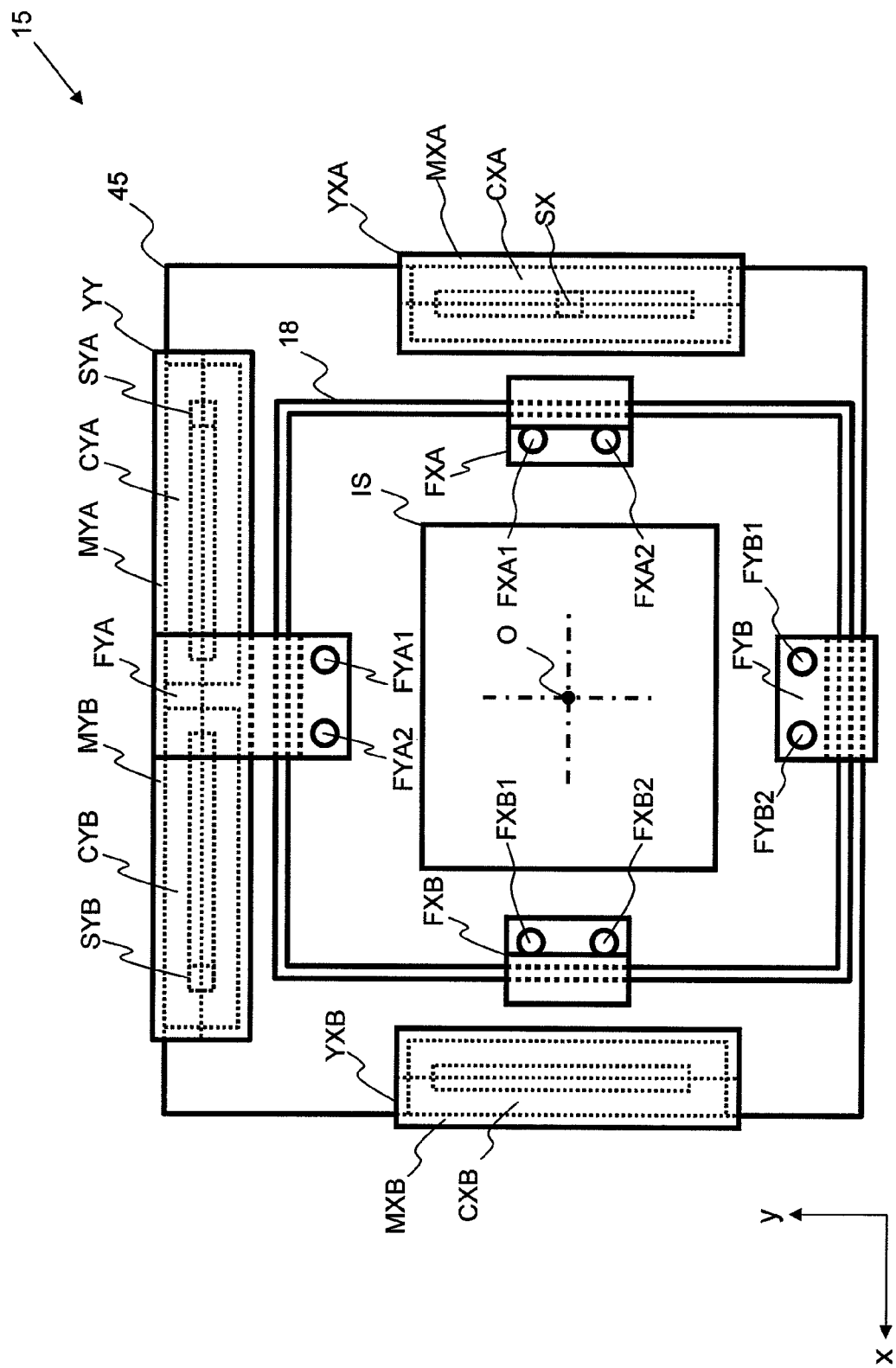
FIG. 16 is a front view of the driving unit of the anti-shake unit of the second embodiment.
Figure 17:
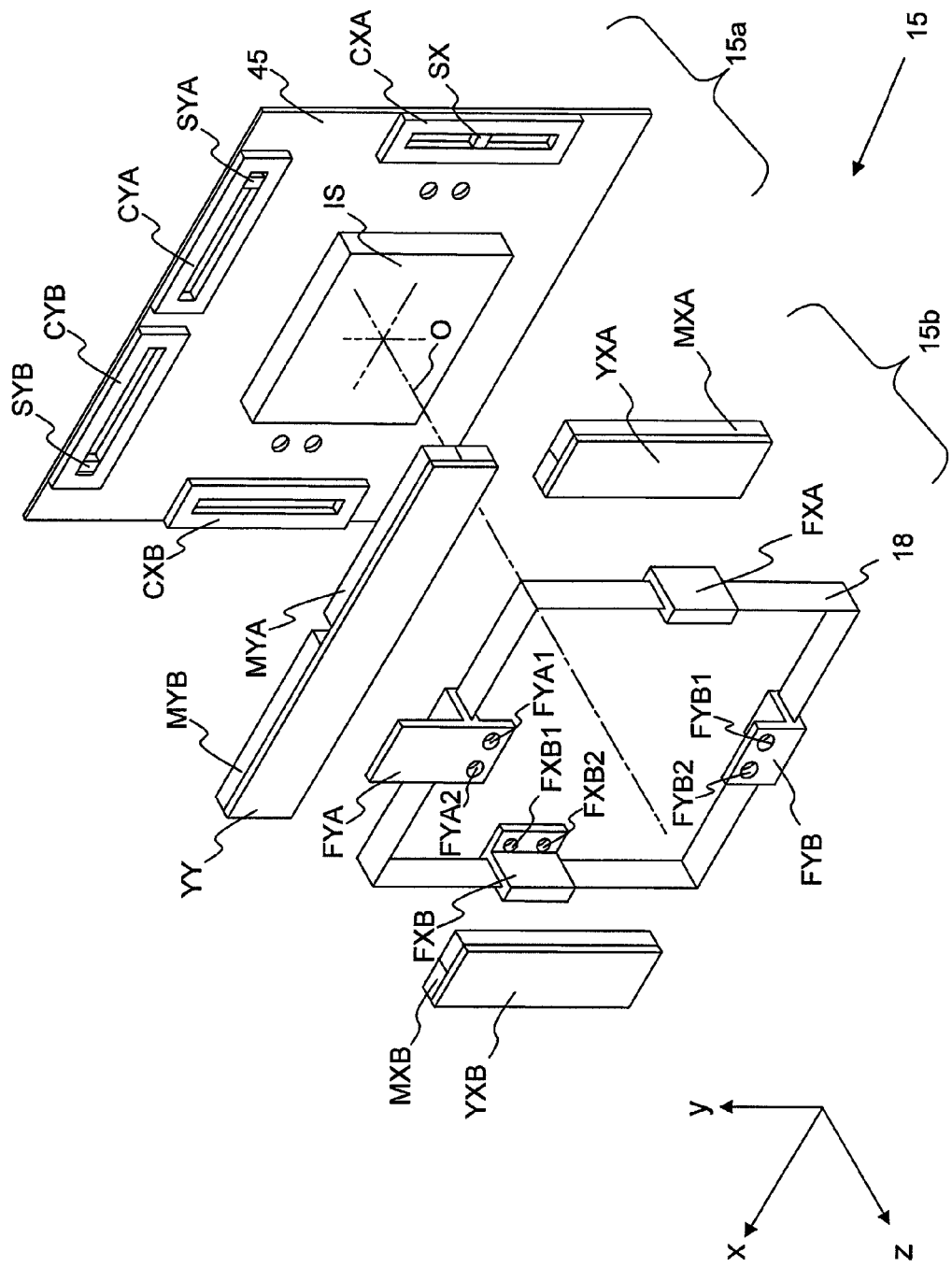
FIG. 17 is a decomposed perspective view of the driving unit of the second embodiment.
Figure 18:
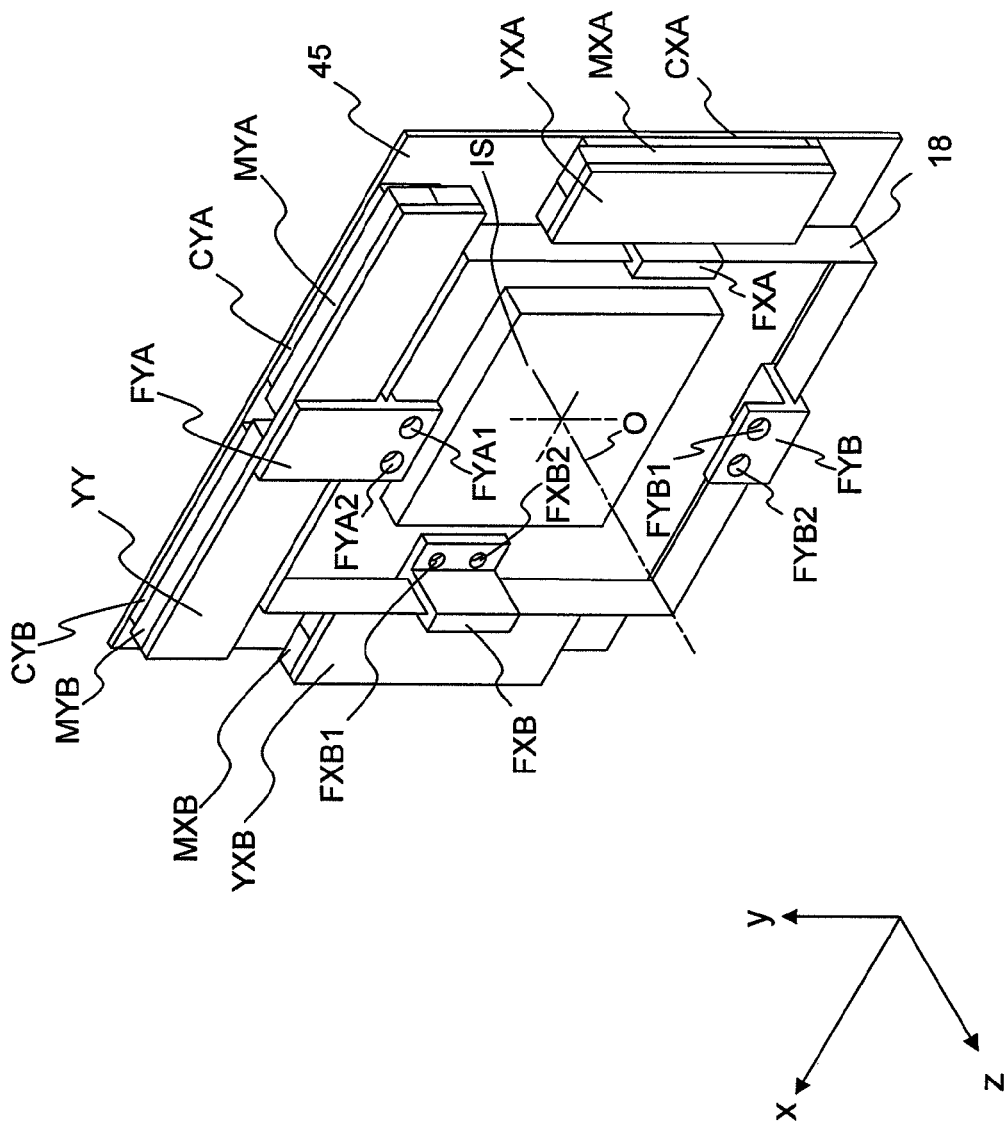
FIG. 18 is a perspective view of the driving unit of the second embodiment.

Next, the detail of the driving unit 15 is explained (see FIGS. 16 to 18). The first horizontal driving coil CXA, the second horizontal driving coil CXB, the first vertical driving coil CYA, the second vertical driving coil CYB, the first horizontal frame connecting unit FXA, the second horizontal frame connecting unit FXB, the first vertical hall sensor SYA, the second vertical hall sensor SYB, and the horizontal hall sensor SX are attached to the circuit board 45.

Constructions of the rectangular frame 18, the first horizontal frame connecting unit FXA, the second horizontal frame connecting unit FXB, the first vertical frame fixing unit FYA, and the second vertical frame fixing unit FYB are the same as those in the first embodiment.

The circuit board 45 is movably and rotatably supported in the xy plane by the fixed unit 15b and the lens barrel 2 through the rectangular frame 18.

The first and second horizontal driving and position-detecting yokes YXA and YXB and the vertical driving and position-detecting yoke YY are board-shaped metallic magnetic members.

The first horizontal driving and position-detecting yoke YXA is arranged perpendicular to the third direction z, and attached (glued) to the lens barrel 2 on the right side when viewed from the third direction z and the lens barrel 2 side.

The second horizontal driving and position-detecting yoke YXB is arranged perpendicular to the third direction z, and attached (glued) to the lens barrel 2 on the left side when viewed from the third direction z and the lens barrel 2 side.

The vertical driving and position-detecting yoke YY is arranged perpendicular to the third direction z, and attached (glued) to the first vertical frame fixing unit FYA on the top side when viewed from the third direction z and the lens barrel 2 side.

The imaging sensor IS is arranged between the first and second horizontal driving and position-detecting yokes YXA and YXB in the first direction x, when viewed from the third direction z.

The first horizontal driving and position-detecting magnet MXA is attached to the first horizontal driving and position-detecting yoke YXA. The second horizontal driving and position-detecting magnet MXB is attached to the second horizontal driving and position-detecting yoke YXB. The first and second vertical driving and position-detecting magnets MYA and MYB are attached to the vertical driving and position-detecting yoke YY.

In an initial state before the movable unit 15a starts to move under the condition where it is not affected by gravity, namely when the imaging surface of the imaging sensor IS lies parallel to the horizontal plane (is facing upwards or downwards), it is desirable to have the circuit board 45 arranged such that the optical axis O passes through the center of the effective imaging field of the imaging sensor IS, two sides of a rectangle of the effective imaging field of the imaging sensor IS are parallel to the first direction x; the other two sides of the rectangle of the effective imaging field of the imaging sensor IS are parallel to the second direction y, and that the rectangular frame 18 is not transformed elastically and forms a rectangular shape.

The imaging sensor IS is arranged at the side of the circuit board 45 that faces the lens barrel 2.

The first horizontal driving coil CXA and the horizontal hall sensor SX face the first horizontal driving and position-detecting magnet MXA in the third direction z. The second horizontal driving coil CXB faces the second horizontal driving and position-detecting magnet MXB in the third direction z.

The first vertical driving coil CYA and the first vertical hall sensor SYA face the first vertical driving and position-detecting magnet MYA in the third direction z. The second vertical driving coil CYB and the second vertical hall sensor SYB face the second vertical driving and position-detecting magnet MYB in the third direction z.

The first and second horizontal driving and position-detecting magnets MXA and MXB are magnetized in the third direction z (in the thickness direction), the N pole and S pole of the first horizontal driving and position-detecting magnet MXA are arranged in the first direction x, and the N pole and S pole of the second horizontal driving and position-detecting magnet MXB are arranged in the first direction x.

The length of the first horizontal driving and position-detecting magnet MXA in the second direction y is longer in comparison with the effective length of the first horizontal driving coil CXA in the second direction y, so that the first horizontal driving coil CXA and the horizontal driving sensor SX remain in a constant magnetic field throughout the movable unit's 15a full range of motion in the second direction y.

The length of the second horizontal driving and position-detecting magnet MXB in the second direction y is longer in comparison with the effective length of the second horizontal driving coil CXB in the second direction y, so that the second horizontal driving coil CXB remains in a constant magnetic field throughout the movable unit's 15a full range of motion in the second direction y.

The first and second vertical driving and position-detecting magnets MYA and MYB are magnetized in the third direction z (in a thickness direction), the N pole and S pole of the first vertical driving and position-detecting magnet MYA are arranged in the second direction y, and the N pole and S pole of the second vertical driving and position-detecting magnet MYB are arranged in the second direction y.

The length of the first vertical driving and position-detecting magnet MYA in the first direction x is longer in comparison with the effective length of the first vertical driving coil CYA in the first direction x, so that the first vertical driving coil CYA and the first vertical hall sensor SYA remain in a constant magnetic field throughout the movable unit's 15a full range of motion in the first direction x.

The length of the second vertical driving and position-detecting magnet MYB in the first direction x is longer in comparison with the effective length of the second vertical driving coil CYB in the first direction x, so that the second vertical driving coil CYB and the second vertical hall sensor SYB remain in a constant magnetic field throughout the movable unit's 15a full range of motion in the first direction x.

The coil pattern of the first horizontal driving coil CXA has a line segment which is parallel to the second direction y, so that the movable unit 15a, which includes the first horizontal driving coil CXA, moves in the first direction x when a horizontal electromagnetic force is applied.

The coil pattern of the second horizontal driving coil CXB has a line segment which is parallel to the second direction y, so that the movable unit 15a, which includes the second horizontal driving coil CXB, moves in the first direction x when the horizontal electromagnetic force is applied.

The horizontal electromagnetic force occurs on the basis of the current that flows through the first horizontal driving coil CXA and the magnetic field of the first horizontal driving and position-detecting magnet MXA and on the basis of the current that flows through the second horizontal driving coil CXB and the magnetic field of the second horizontal driving and position-detecting magnet MXB.

The coil pattern of the first vertical driving coil CYA has a line segment which is parallel to the first direction x, so that the movable unit 15a, which includes the first vertical driving coil CYA, moves in the second direction y when a first vertical electromagnetic force is applied.

The first vertical electromagnetic force occurs on the basis of the current that flows through the first vertical driving coil CYA and the magnetic field of the first vertical driving and position-detecting magnet MYA.

The coil pattern of the second vertical driving coil CYB has a line segment which is parallel to the first direction x, so that the movable unit 15a, which includes the second vertical driving coil CYB, moves in the second direction y when a second vertical electro-magnetic force is applied.

The second vertical electro-magnetic force occurs on the basis of the current that flows through the second vertical driving coil CYB and the magnetic field of the second vertical driving and position-detecting magnet MYB.

The first vertical hall sensor SYA is a magneto-electric converting element (a magnetic field change-detection element) utilizing the Hall effect, and is used for detecting the position of the movable unit 15a in the second direction y by detecting a change in the magnetic-flux density from the first vertical driving and position-detecting magnet MYA, corresponding to a position change of the movable unit 15a in the second direction y.

The second vertical hall sensor SYB is a magneto-electric converting element (a magnetic field change-detection element) utilizing the Hall effect, and is used for detecting the position of the movable unit 15a in the second direction y by detecting a change in the magnetic-flux density from the second vertical driving and position-detecting magnet MYB, corresponding to a position change of the movable unit 15a in the second direction y.

The horizontal hall sensor SX is a magneto-electric converting element (a magnetic field change-detection element) utilizing the Hall effect, and is used for detecting the position of the movable unit 15a in the first direction x by detecting a change in the magnetic-flux density from the first horizontal driving and position-detecting magnet MXA, corresponding to a position change of the movable unit 15a in the first direction x.

The first vertical hall sensor SYA is arranged inside the first vertical driving coil CYA, the second vertical hall sensor SYB is arranged inside the second vertical driving coil CYB, and the horizontal hall sensor SX is arranged inside the first horizontal driving coil CXA. The first and second vertical hall sensors SYA and SYB are arranged so their separation is as large as possible.

The first horizontal driving and position-detecting yoke YXA prevents the magnetic field of the first horizontal driving and position-detecting magnet MXA from diffusing, and increases the magnetic-flux density between the first horizontal driving coil CXA and horizontal hall sensor SX, and the first horizontal driving and position-detecting magnet MXA.

The second horizontal driving and position-detecting yoke YXB prevents the magnetic field of the second horizontal driving and position-detecting magnet MXB from diffusing, and increases the magnetic-flux density between the second horizontal driving coil CXB and the second horizontal driving and position-detecting magnet MXB.

The vertical driving and position-detecting yoke YY prevents the magnetic field of the first vertical driving and position-detecting magnet MYA from diffusing, prevents the magnetic field of the second vertical driving and position-detecting magnet MYB from diffusing, increases the magnetic-flux density between the first vertical driving coil CYA and the first vertical hall sensor SYA, and the first vertical driving and position-detecting magnet MYA, and increases the magnetic-flux density between the second vertical driving coil CYB and second vertical hall sensor SYB, and the second vertical driving and position-detecting magnet MYB.

In the second embodiment, the movable unit 15a can be movably and rotatably supported in the xy plane through the elastic transformation of the rectangular frame 18, without a guide mechanism or a mechanism that supports the movable unit 15a by using a ball. Therefore, because it is not necessary to consider a gap and wear based on the clearance of the guide mechanism, a highly accurate and highly stable anti-shake operation can be performed.

Further, the construction can be simplified compared to when a plurality of elastic members are used for movably supporting the movable unit 15a, and united molding or insert molding can be used, so the cost of production can be reduced.

In the second embodiment, the elastic transformation of the rectangular frame 18 is used to move and rotate the movable unit 15a. However, to consider the elastic force of the rectangular frame 18 for the movement control of the movable unit 15a is not necessary, because the movement control method (the PID calculation of the controller 13) is a feedback control method that calculates the movement quantity (the driving force) required to move to the next position of the movable unit 15a on the basis of information regarding its present position; so it is not necessary to perform a complex calculation considering the elastic force.

In the first embodiment, it is explained that the circuit board 45, which includes the imaging sensor IS, is fastened to the movable unit 15a and is movable in the xy plane. However, in the case where the imaging sensor IS is fixed (not movable) and a hand-shake correcting lens (not depicted) is fastened to the movable unit 15a and is movable in the xy plane, the same effect can be obtained.

In the first and second embodiments, it is explained that the hall sensor is used for position detecting as the magnetic field change-detection element, however, another detection element may be used for position detecting on purposes. Specifically, the detection element may be an MI (Magnetic Impedance) sensor, in other words a high-frequency carrier-type magnetic field sensor, or a magnetic resonance-type magnetic field detection element, or an MR (Magneto-Resistance effect) element. When one of either the MI sensor, the magnetic resonance-type magnetic field detection element, or the MR element is used, the information regarding the position of the movable unit can be obtained by detecting the magnetic field change, similar to using the hall sensor.

Further, it is explained that the movement of the movable unit 15a is performed, on the basis of electro-magnetic force, from the magnet and the coil as an actuator. However, the movement of the movable unit 15a may be performed by another actuator.

Further, it is explained that the supporting mechanism (the driving unit 15) that has the movable unit 15a and the fixed unit 15b is used as the anti-shake apparatus including the image blur correcting device. However, it may be used for another apparatus that has a movable unit 15a movably supported in the xy plane.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2006-171397 (filed on Jun. 21, 2006) which is expressly incorporated herein by reference, in its entirety.

The invention claimed is:

1. A supporting mechanism comprising:
  a movable unit that is movable in a reference plane; and
  a fixed unit that has a rectangular frame, a part of the fixed unit being connected to said movable unit, the rectangular frame comprising strips extending perpendicular to said reference plane, the rectangular frame being fixed to another part of said fixed unit, said fixed unit movably supporting said movable unit through an elastic deformation of said rectangular frame.

2. The supporting mechanism according to claim 1, wherein a movement control of said movable unit is a feedback control that calculates a movement quantity to a next position of said movable unit on the basis of information regarding a present position of said movable unit, driven by an actuator.

3. The supporting mechanism according to claim 2, wherein said actuator uses electro-magnetic force from a magnet and coil to move said movable unit; and
  said present position of said movable unit is detected by a magnetic field change-detection element.

4. The supporting mechanism according to claim 1, wherein two of said strips that face each other are connected to said movable unit, and another two of said strips that face each other are fixed to said fixed unit.

5. The supporting mechanism according to claim 1, wherein said movable unit is movably and rotatably supported in said reference plane by said fixed unit.

6. The supporting mechanism according to claim 1, wherein said rectangular frame comprises resin or metal;
  at least parts of a connecting member between said rectangular frame and said movable unit and at least parts of a fixing member between said rectangular frame and said another part of said fixed unit are resin; and
  said rectangular frame, said connecting member, and said fixing member are formed by united molding or insert molding.

7. The supporting mechanism according to claim 1, wherein said supporting mechanism comprises an image blur correcting device of a photographing apparatus;
  said movable unit supports one of an imaging sensor or a hand-shake correcting lens; and
  said reference plane is perpendicular to an optical axis of said photographing apparatus.

8. The supporting mechanism according to claim 1, the rectangular frame defining an aperture lying in a plane parallel to the reference plane, a shape of the aperture defined by the rectangular frame changing upon elastic deformation of the rectangular frame.

9. The supporting mechanism according to claim 1, said fixed unit being connected to said movable unit at said part of said fixed unit by a connecting mechanism, said rectangular frame being fixed to said fixed unit at said another part of said fixed unit by a fixing mechanism, movement of said movable unit through the elastic deformation of said rectangular frame being independent of an elasticity of said fixing mechanism and of an elasticity of said connecting mechanism.

10. A supporting mechanism comprising:
  a rectangular frame that consists of four strips, having predetermined widths, and that elastically deforms in a reference plane that is perpendicular to directions of widths of said four strips;
  a movable unit that is connected to said rectangular frame; and
  a fixed unit that is fixed to said rectangular frame and that movably supports said movable unit to move in said reference plane through an elastic deformation of said rectangular frame.

11. The supporting mechanism according to claim 10, two parallel strips of said rectangular frame being connected to said movable unit, and another two parallel strips of said rectangular frame being fixed to said fixed unit.

12. The supporting mechanism according to claim 10, said supporting mechanism comprising an image blur correcting mechanism of a photographing apparatus;

said movable unit supporting one of an imaging sensor or a hand shake correcting lens; and said reference plane extending perpendicular to an optical axis of the photographing apparatus.

13. The supporting mechanism according to claim 10, the rectangular frame defining an aperture lying in a plane parallel to the reference plane, a shape of the aperture defined by said rectangular frame changing upon elastic deformation of said rectangular frame.

14. The supporting mechanism according to claim 10, the movable unit being connected to said rectangular frame by a connection mechanism, the fixed unit being fixed to said rectangular frame by a fixing mechanism, movement of said movable unit through the elastic deformation of said rectangular frame being independent of an elasticity of the connection mechanism and that of the fixing mechanism.

15. An image blur correcting device comprising:

a rectangular shape ring that has a predetermined width and that elastically deforms in a reference plane that is perpendicular to a direction of the width of said rectangular shape ring;

a movable unit for correcting image blur that is connected to said rectangular shape ring so that the image blur is corrected by movement of said movable unit; and a fixed unit that is fixed to said rectangular shape ring and that movably supports said movable unit to move in said reference plane through an elastic deformation of said rectangular shape ring.

16. The image blur correcting device according to claim 15, wherein said movable unit mounts an imaging sensor that is located within said rectangular shape ring.

17. The image blur correcting device according to claim 15, said rectangular shape ring comprising four strips, a parallel two of said strips being connected to said movable unit, another parallel two of said strips being fixed to said fixed unit.

18. The image blur correcting device according to claim 15, said image blur correcting device comprising an image blur correcting device of a photographing apparatus;

said movable unit supporting one of an imaging sensor or a hand shake correcting lens; and said reference plane extending perpendicular to an optical axis of the photographing apparatus.

19. The image blur correcting device according to claim 15, the rectangular shape ring defining an aperture lying in a plane parallel to the reference plane, a shape of the aperture defined by said rectangular shape ring changing upon elastic deformation of said rectangular shape ring.

20. The image blur correcting device according to claim 15, the movable unit being connected to the rectangular shape ring by a connection mechanism, the fixed unit being fixed to said rectangular shape ring by a fixing mechanism, movement of the movable unit through the elastic deformation of said rectangular shaped ring being independent of an elasticity of the connection mechanism and that of the fixing mechanism.

* * * * *